Aug. 13, 1968     H. N. K. PATON     3,396,762
METHODS OF DENSIFYING AND DETERRING DETERIORATION AND
CONTAMINATION OF DISCRETE PARTICLE
MATERIAL IN A CONTAINER
Filed Sept. 9, 1963     12 Sheets-Sheet 1
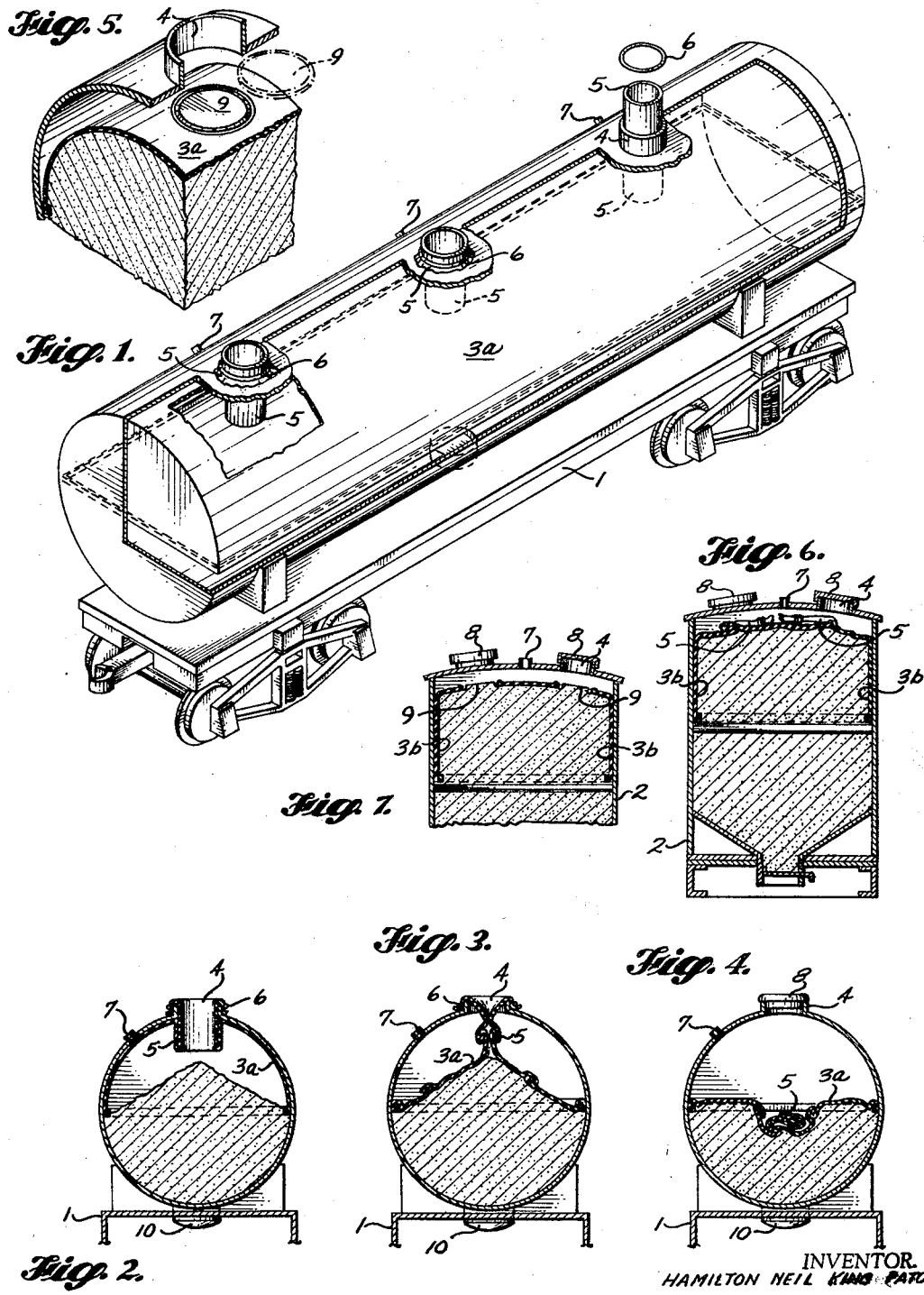
INVENTOR.
HAMILTON NEIL KING PATON
BY
Robert W. Beach
ATTORNEY Aug. 13, 1968  H. N. K. PATON  3,396,762
METHODS OF DENSIFYING AND DETERRING DETERIORATION AND
CONTAMINATION OF DISCRETE PARTICLE
MATERIAL IN A CONTAINER
Filed Sept. 9, 1963  12 Sheets-Sheet 2
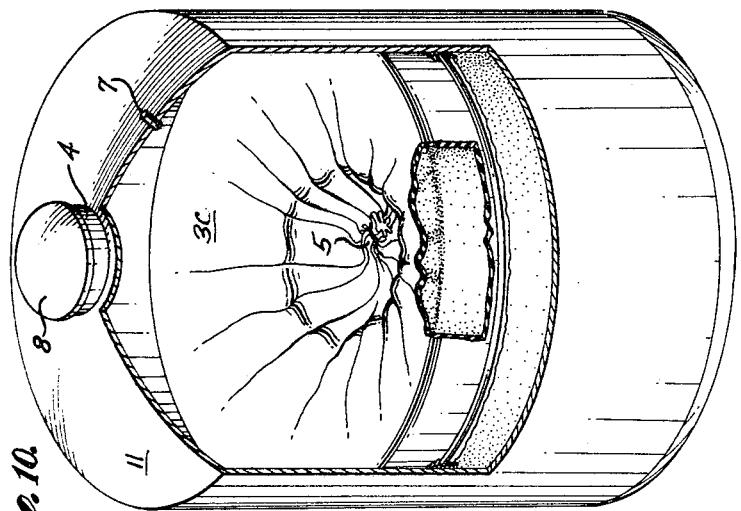
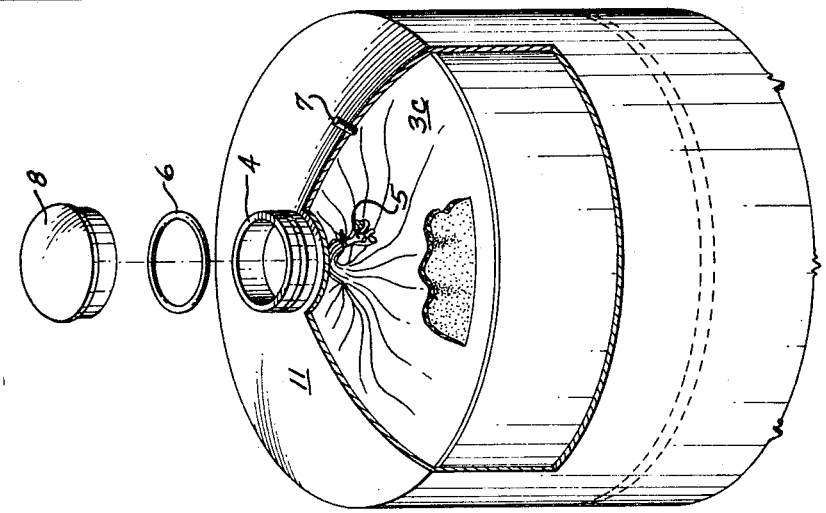
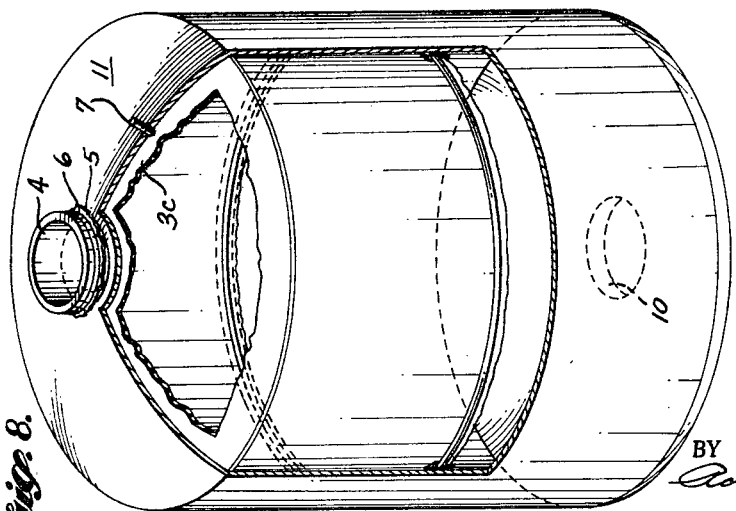
INVENTOR.
HAMILTON NEIL KING PATON
BY
Robert W. Beach
ATTORNEY INVENTOR.
HAMILTON NEIL KING PATON
BY
Robert W. Beach
ATTORNEY

INVENTOR.
HAMILTON NEIL KING PATON

BY
Robert W. Beach

ATTORNEY

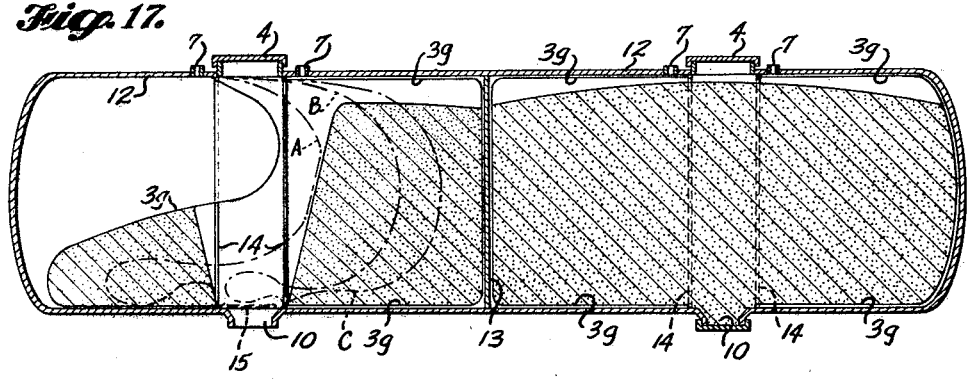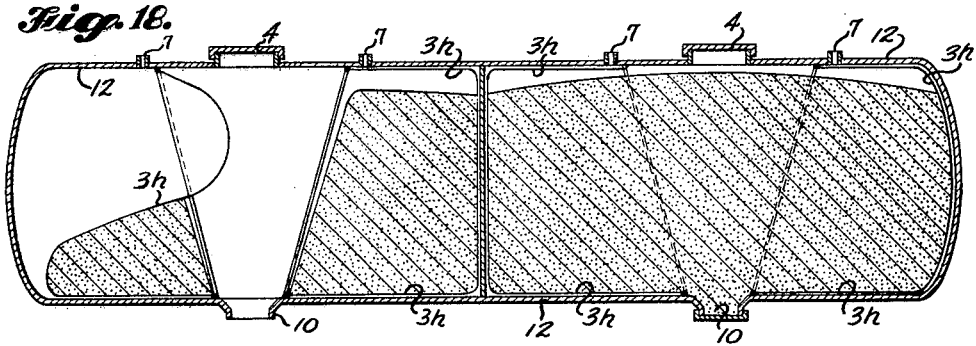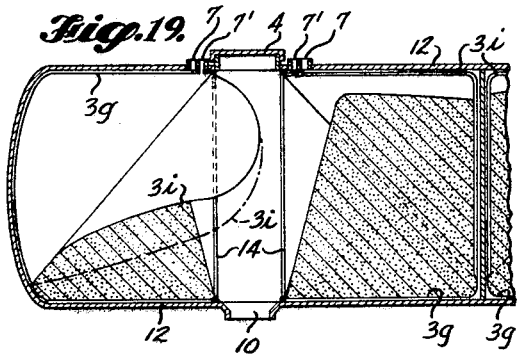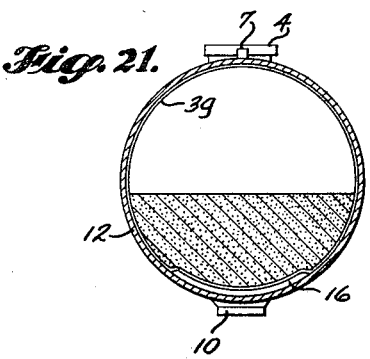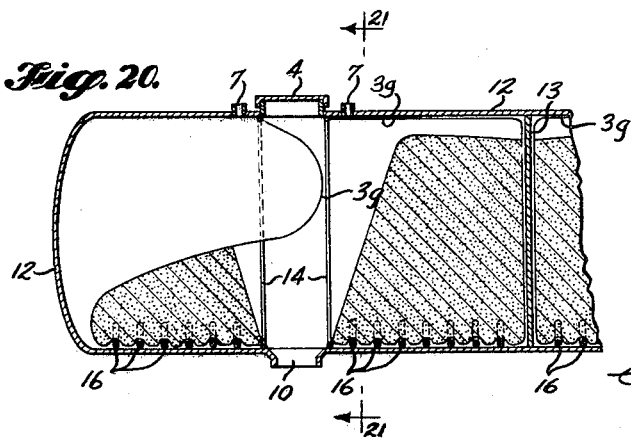

Aug. 13, 1968     H. N. K. PATON     3,396,762
METHODS OF DENSIFYING AND DETERRING DETERIORATION AND
CONTAMINATION OF DISCRETE PARTICLE
MATERIAL IN A CONTAINER
Filed Sept. 9, 1963     12 Sheets-Sheet 6
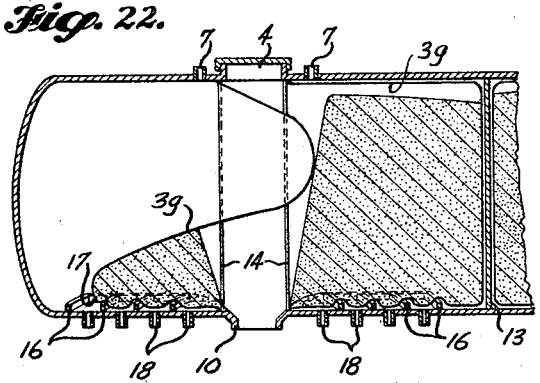
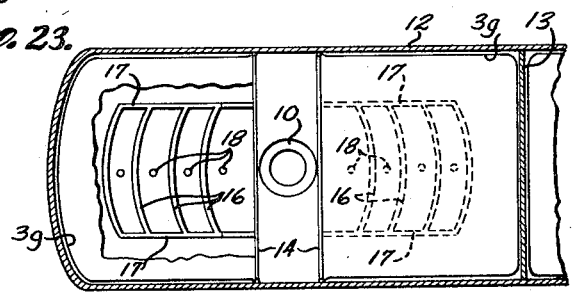
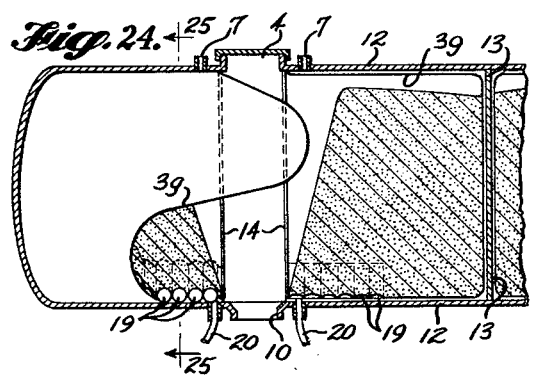
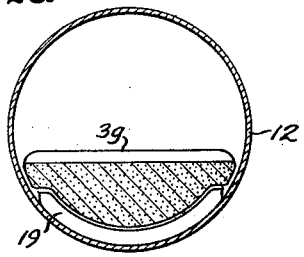
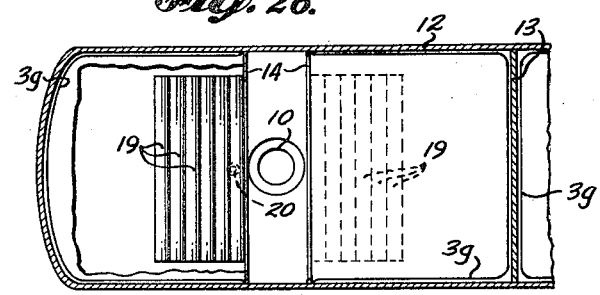
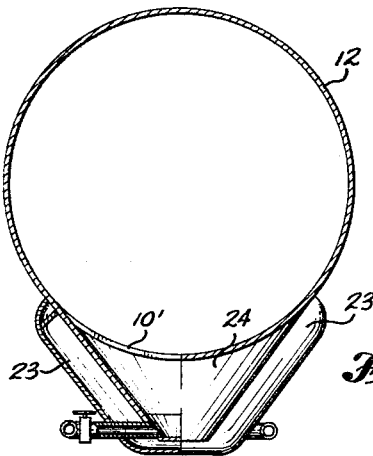
INVENTOR.
HAMILTON NEIL KING PATON
BY
Robert W. Beach
ATTORNEY

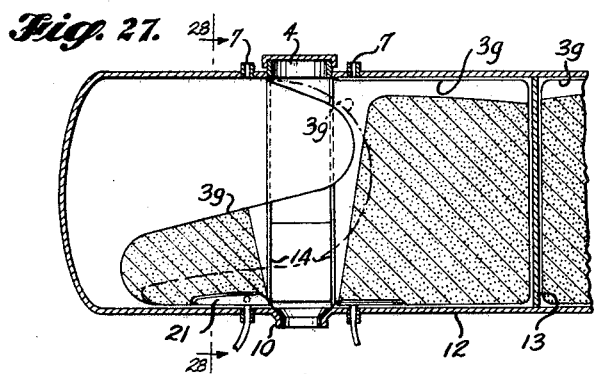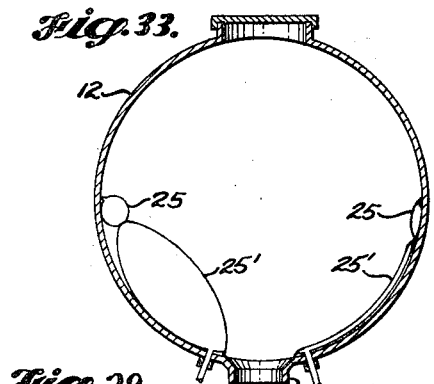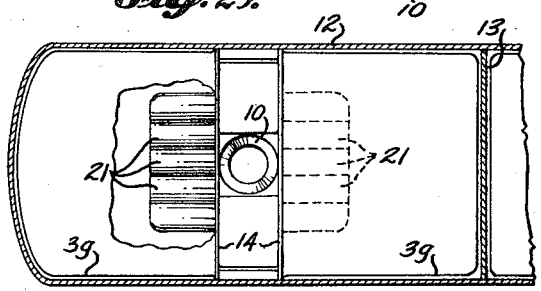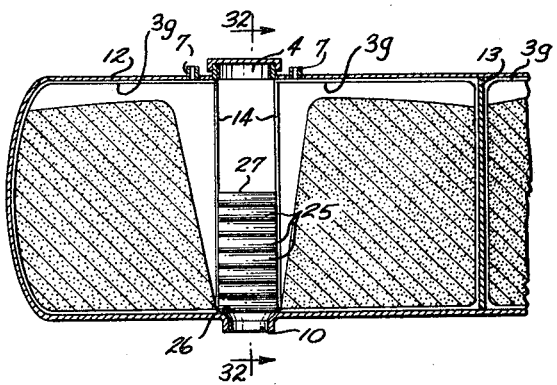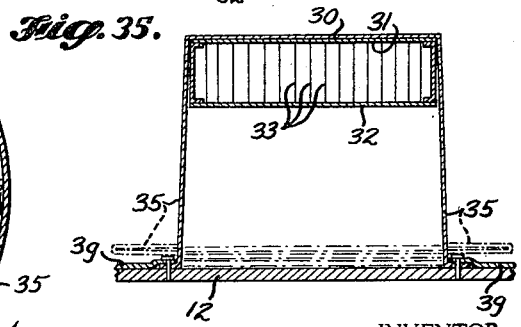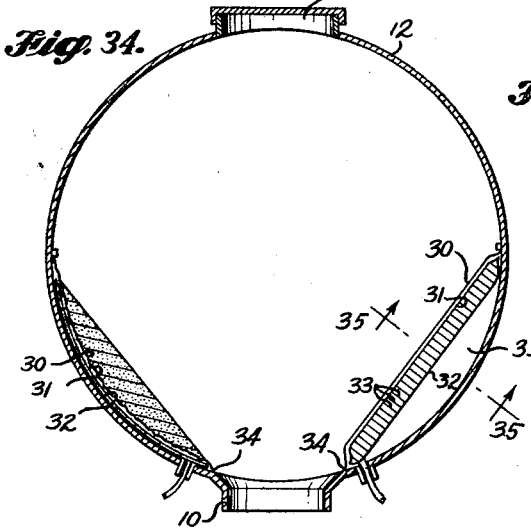
INVENTOR.
HAMILTON NEIL KING PATON
BY Robert W. Beach
ATTORNEY

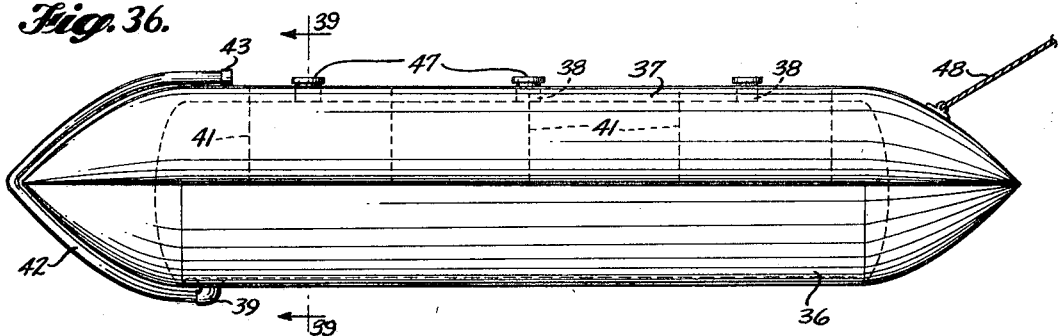
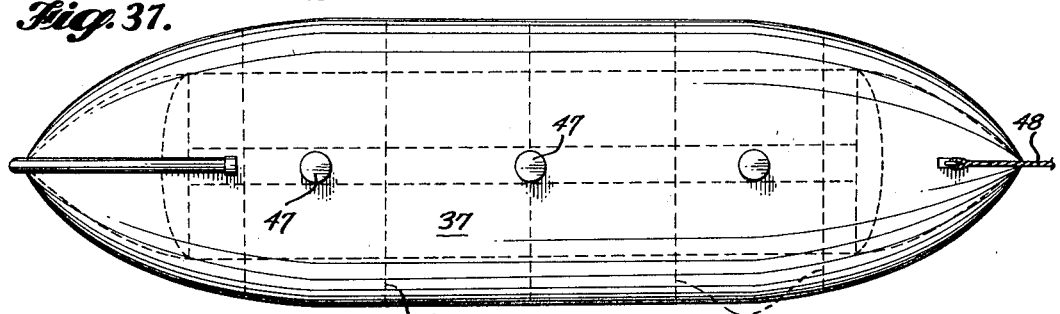
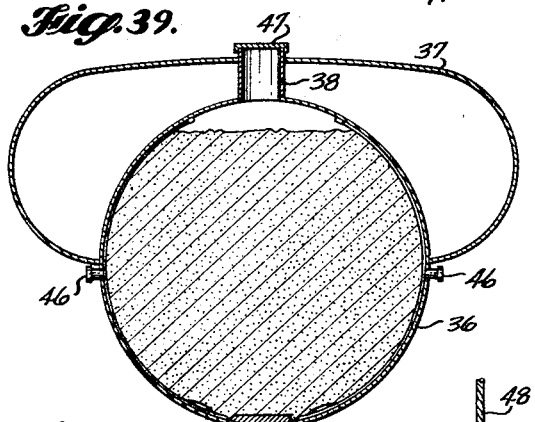
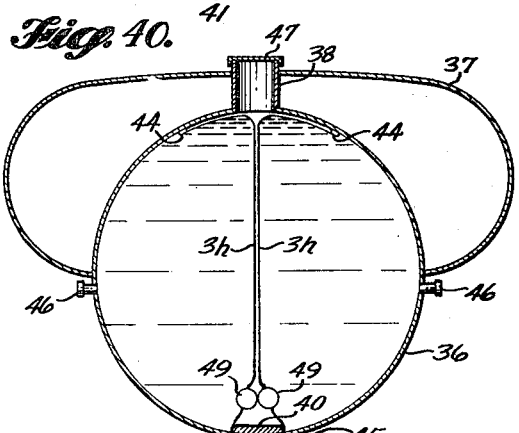
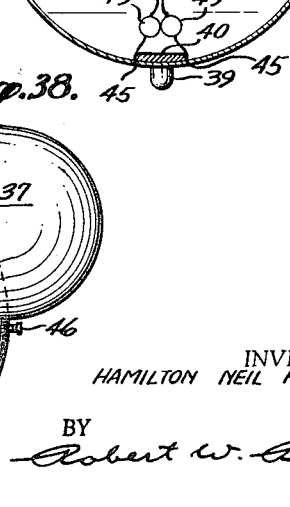
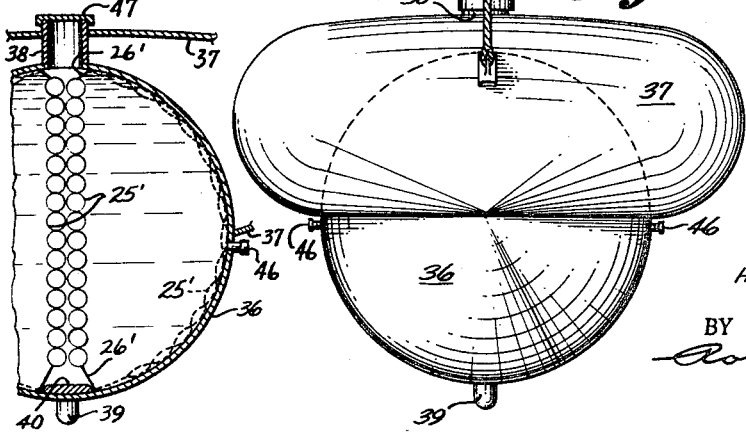
INVENTOR.
HAMILTON NEIL KING PATON
BY
Robert W. Beach
ATTORNEY

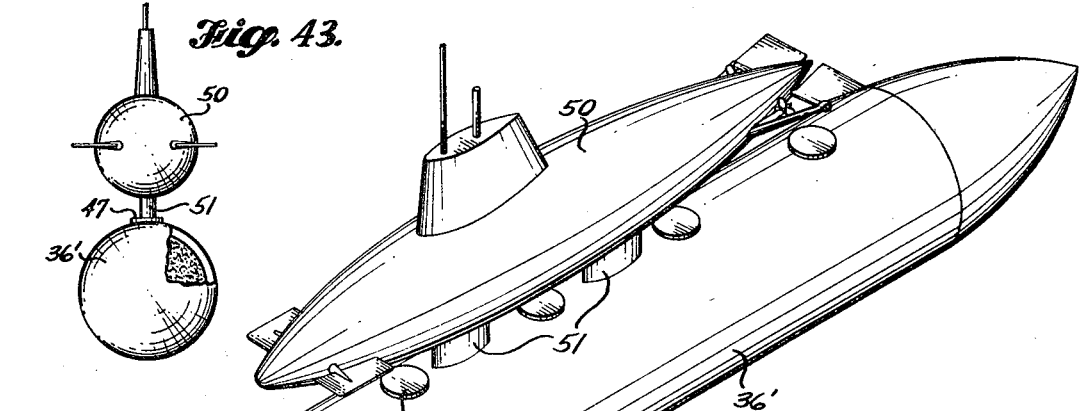
Fig. 43.
Fig. 42.
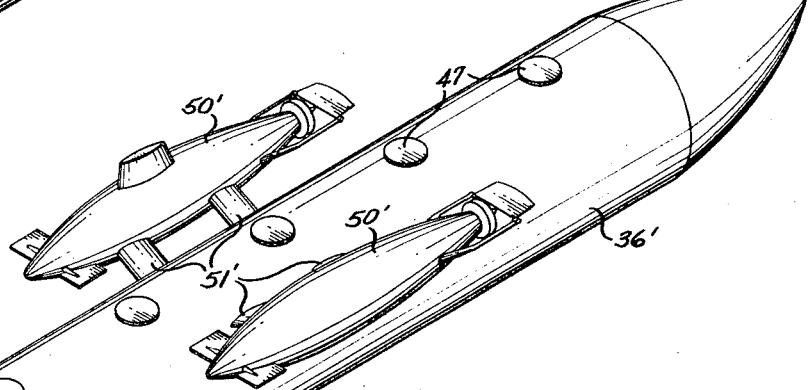
Fig. 44.
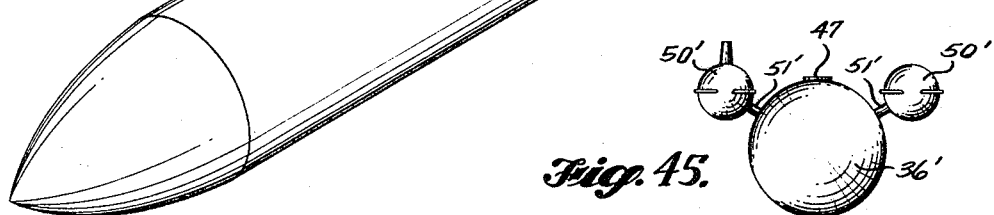
Fig. 45.
INVENTOR.
HAMILTON NEIL KING PATON
BY
Robert W. Beach
ATTORNEY

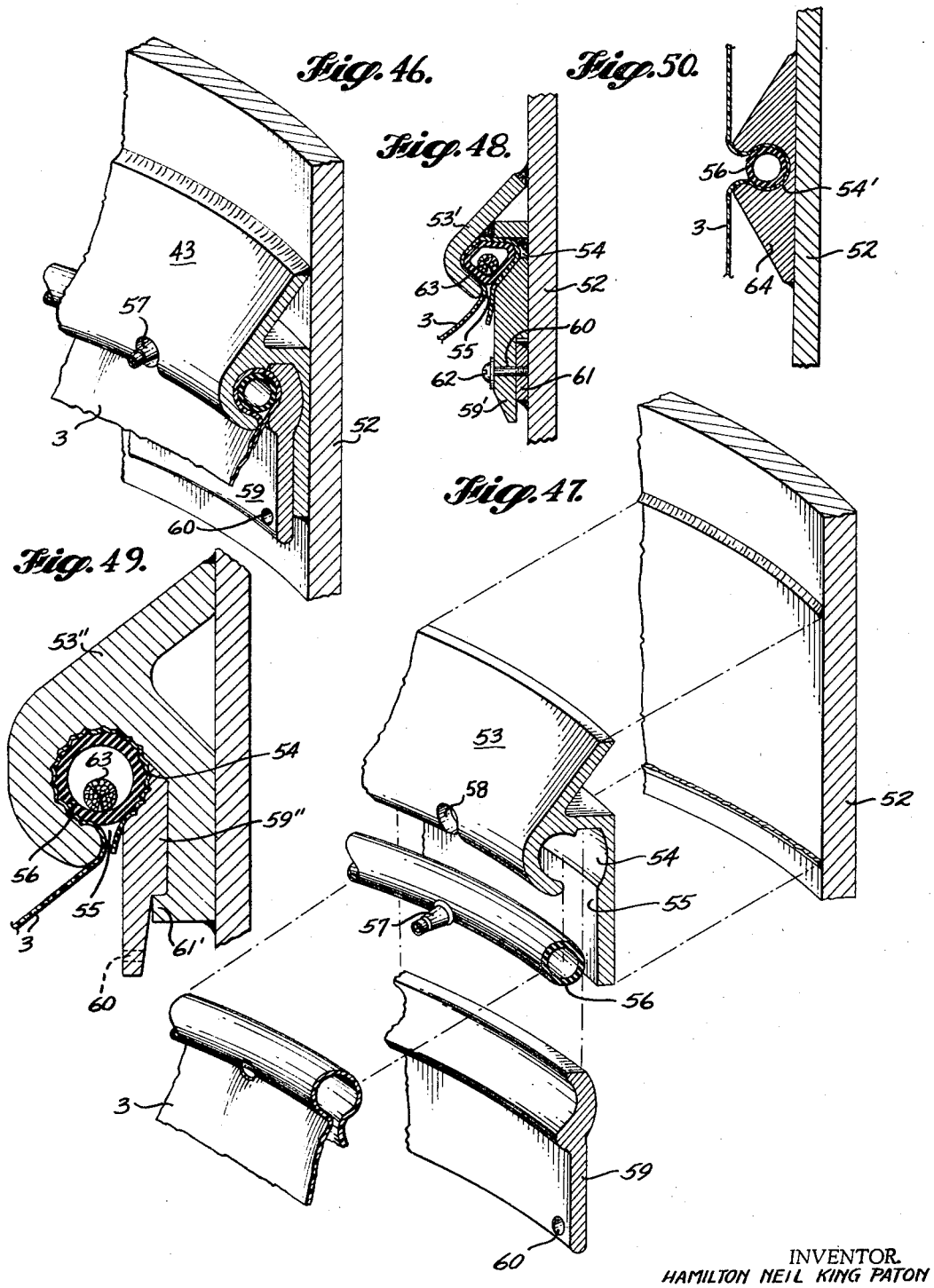

Aug. 13, 1968  H. N. K. PATON  3,396,762
METHODS OF DENSIFYING AND DETERRING DETERIORATION AND
CONTAMINATION OF DISCRETE PARTICLE
MATERIAL IN A CONTAINER
Filed Sept. 9, 1963  12 Sheets-Sheet 11
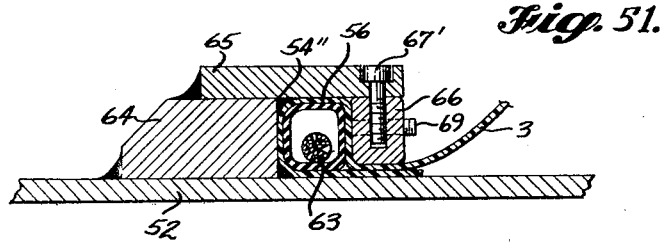
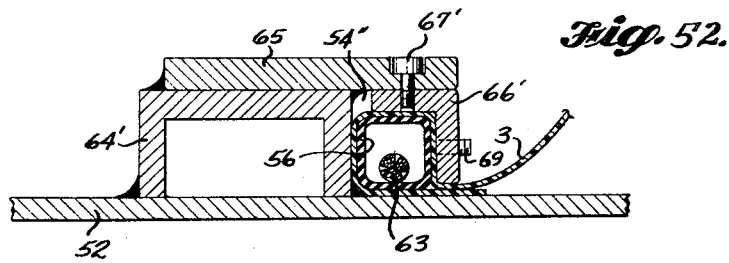
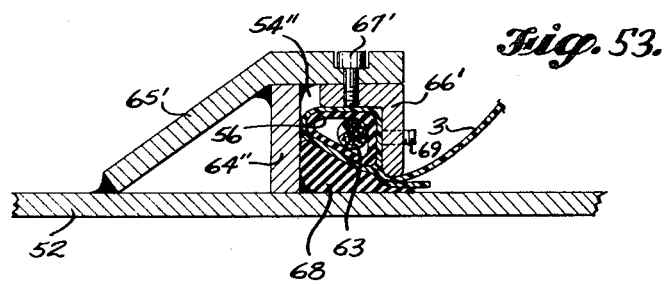
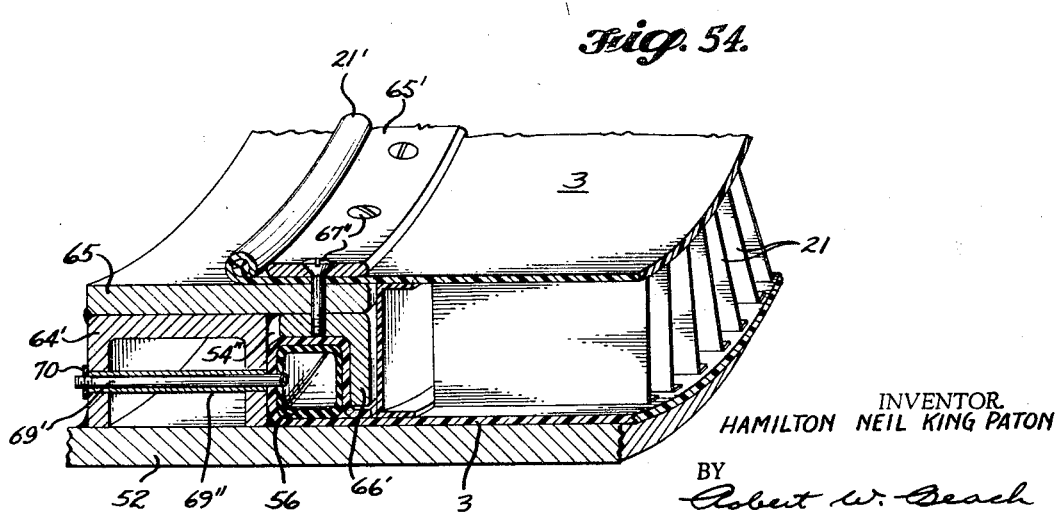
INVENTOR.
HAMILTON NEIL KING PATON
BY
ATTORNEY

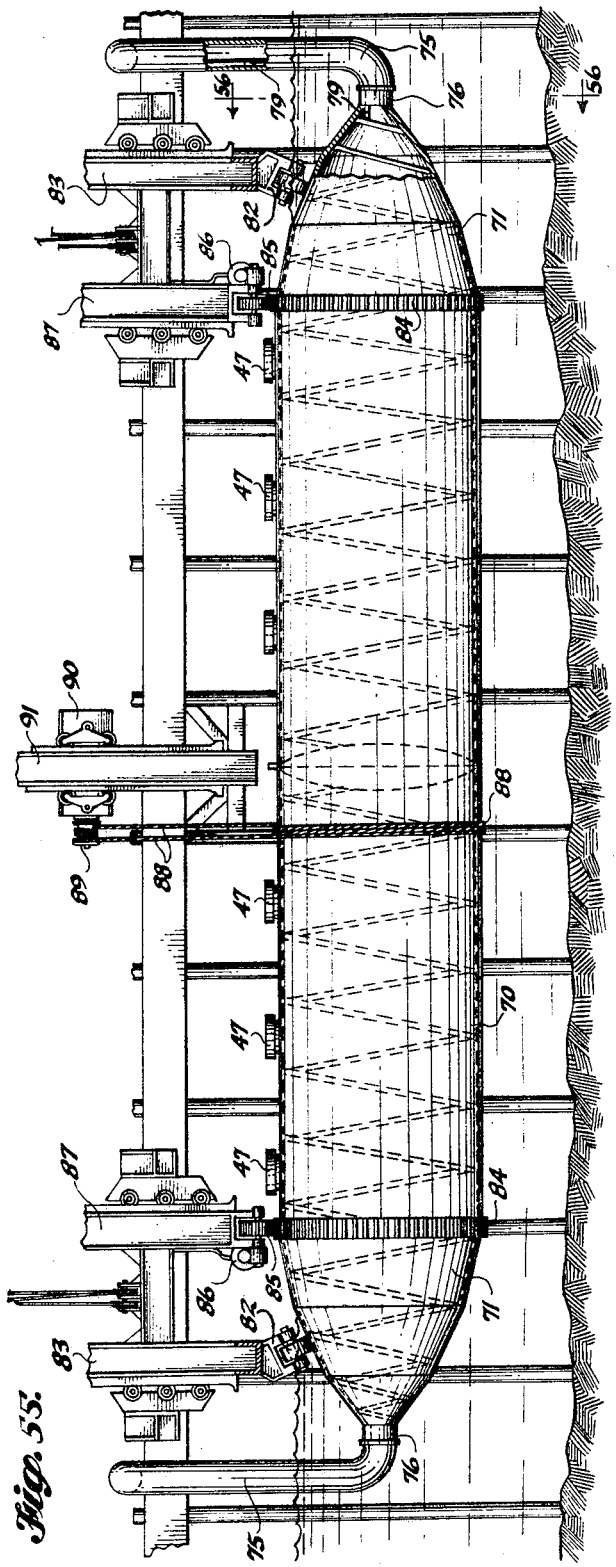

United States Patent Office 3,396,762
Patented Aug. 13, 1968

3,396,762
METHODS OF DENSIFYING AND DETERRING DETERIORATION AND CONTAMINATION OF DISCRETE PARTICLE MATERIAL IN A CONTAINER
Hamilton Neil King Paton, Bellevue, Wash., assignor to Dynabulk Corporation, Bellevue, Wash., a corporation of Washington
Filed Sept. 9, 1963, Ser. No. 307,447
9 Claims. (Cl. 141—7)

This invention relates to a container having an internal membrane, the edges of which are sealed to the wall of a container in which material composed of discrete particles, or having the character of a sludge or slurry, is received.

An important object of the present invention is to provide a thin partition membrane in the upper portion of the container between the wall of the container and the material in the container, which will serve as an insulating and vapor barrier to deter condensation on the inner wall of a container, particularly one of metal, and to protect the material in the container from being moistened by such condensation on the container wall as may occur. Such membrane also decreases heat conduction between the container wall and discrete particle material within the container to deter freezing of the contained material when the exterior of the container is exposed to low temperatures, and to deter spoilage of organic material in the container resulting from such material being subjected to undesirably high temperatures when the exterior of the container is exposed to high temperature conditions. Such membrane also can be arranged to provide dead air insulating space between it and the container wall to reduce further heat conduction between material in the container and the wall of the container.

A further object is to provide a membrane in a container which can be pressed against discrete particle material in the container for the purpose of packing the particles together to increase the density of the material. The membrane can also be manipulated to assist in discharging material from the container by pressure of the membrane on such material. Preferably pressure of the membrane on the material is effected by providing a differential fluid pressure on opposite sides of the membrane, the pressure being higher in the space between the membrane and the outer wall of the container. Such pressure differential can be effected either by reducing the pressure in the material-receiving space within the container below atmospheric pressure or by increasing the pressure between the membrane and the container wall to a pressure above atmospheric pressure, or both. An important object in effecting such differential pressure between opposite sides of the membrane by reducing below atmospheric pressure the pressure at the material receiving side of the membrane, is that the pressure between the membrane and the container wall can be at atmospheric pressure so as not to exert differential pressure on the outer container wall which could crush it.

Another object is to provide the membrane installation in a container having walls capable of withstanding internal pressure in excess of atmospheric pressure so as to enable the pressure between the container wall and the membrane to be increased above atmospheric for insulation, compaction or discharge of material in the container. Such a container may, for example, be cylindrical or spherical and in the case of a cylindrical container the axis of the container can be either horizontal or vertical, as may be best suited to the particular installation. In any case it will usually be desirable to design the membrane to fit the particular shape of the container, and preferably it will be of a shape complemental to the internal shape of the container wall.

It is a particular object to provide an effective seal securing the edge of the membrane to the interior of the outer container wall in a manner to withstand a substantial differential in fluid pressure on opposite sides of the membrane without leakage and without danger of the membrane being detached from the container wall, even though it is subjected to a considerable tension force.

Another object is to provide a plurality of membranes in a rigid container which are mounted in a manner enabling the membranes to contact each other for affording mutual support. It is preferred that such membranes be of reversible character so that they can turn inside out. In one position such membranes can engage each other for mutual support, as mentioned, and in another position such membranes can engage a rigid wall of the container for support. The edge portion of such a membrane can be attached around the container wall in an upright plane or in a horizontal plane, or along a closed line which is not in a plane. Such a membrane can be of cup shape and may or may not be symmetrical about an axis.

It is also an object of the present invention to provide a membrane which can be manipulated effectively to expedite initial discharge from a container of discrete particle material, which can be used advantageously to complete substantially the operation of discharging material from a container and which can generally facilitate the operation of discharging discrete particle material from a container. Such manipulation of the membrane can be accomplished most effectively by producing a differential fluid pressure on opposite sides of the membrane and preferably such fluid is air.

The membrane installation of the present invention can be utilized effectively either in stationary or mobile containers and it is an object to utilize for the membrane a material which is substantially inelastic and tough, while being highly flexible, wear resistant and economical. At the same time the membrane material should be inert so as not to contaminate material in the container which is edible or which is subject to deterioration or adulteration.

It is an additional object to provide suitable apertures in the container and/or membrane for supply or discharge of fluid or discrete particle material, and to enable such apertures to be sealed easily in fluidtight condition. In this connection it is an object to prevent such an aperture, such as a material discharge aperture, from being obstructed by the membrane when its opposite sides are subjected to differential pressure.

The foregoing objects can be accomplished by membrane installations in containers of various types and shapes having either rigid or flexible walls. Protection of the material in a container from being dampened by condensation, and compaction of such material, can be accomplished by providing a membrane in the upper portion of the container. If material is to be removed by suction from a container which is not designed to withstand an internal pressure lower than atmospheric the membrane is in the form of a liner enclosing the entire material storage space within the container and the liner includes a plurality of membrane sheets which can be pressed into substantially contiguous engagement by application to them of atmospheric pressure between the membrane sheets and the container wall. The attachment of the liner to a flexible or a rigid container can be such as to enable the membrane to follow material in the container as it moves toward an outlet and the differential fluid pressure acting on the liner will press material toward the outlet whether the pressure at the outlet side of the membrane is reduced or the fluid pressure at the side of the membrane opposite the outlet is increased. For this type of operation the liner can be anchored so that the membrane cannot extend over and clog the outlet or special provision can be made to regulate the progress of movement of the membrane toward the outlet, and further provisions can be made to prevent the membrane from clogging the outlet at any time.

If a membrane having the capabilities discussed above is installed in a water craft the fluid employed to exert pressure on the membrane can be water. Whichever type of membrane is utilized its edge can be connected in fluidtight relationship to the wall of the container by anchoring the edge of the membrane in a groove integral with the wall, and securing the membrane edge in such groove by an anchoring strip.

FIGURE 1 is a top perspective of a railway tank car container in which an upper membrane is installed, parts being broken away, and FIGURES 2, 3 and 4 are transverse sections through the tank of FIGURE 1, showing the liner in different operative positions.

FIGURE 5 is a detail top perspective of a portion of the tank of FIGURE 1 and a corresponding portion of the liner showing a modified construction, parts being broken away.

FIGURE 6 is a vertical transverse section through a different type of railway car body in which a membrane according to the present invention is installed, and FIGURE 7 is a similar view showing a slightly modified type of membrane.

FIGURES 8, 9 and 10 are top perspectives of a different type of container in which a membrane according to the present invention is installed, parts being broken away.

Figure 13:
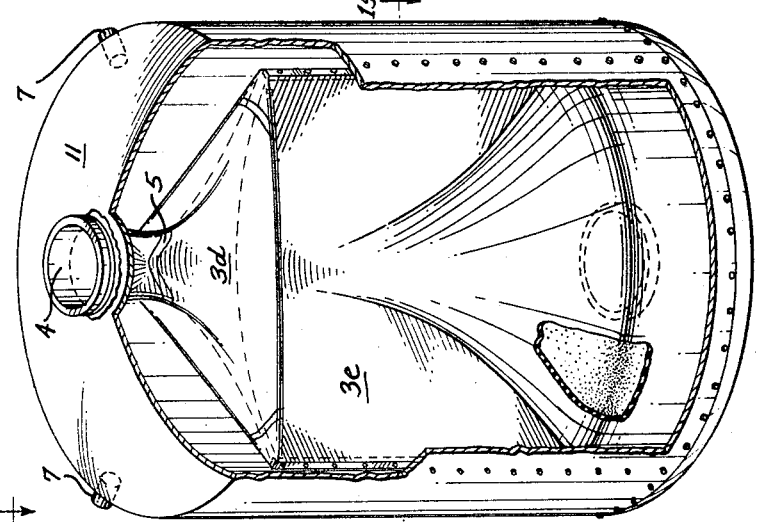
Figure 11:
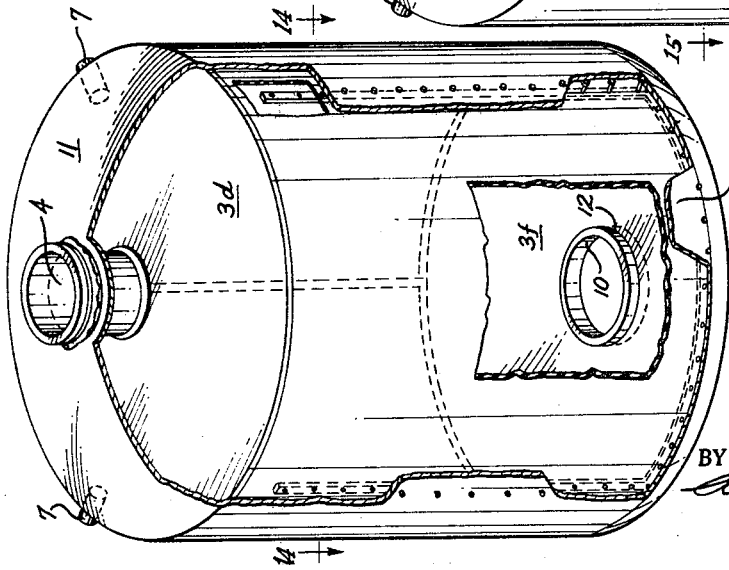
Figure 14:
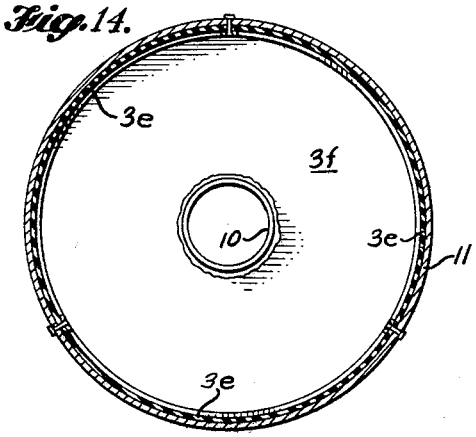
Figure 15:
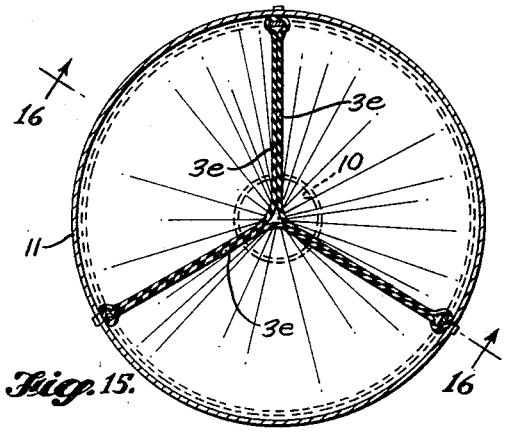
Figure 16:
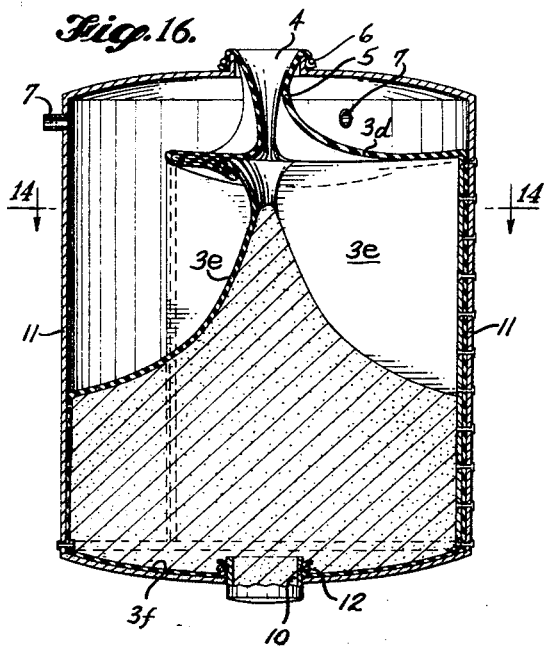

FIGURES 14 and 15 are horizontal transverse sections through the container, FIGURE 14 being taken on line 14—14 of FIGURE 11, and FIGURE 15 being taken on line 15—15 of FIGURE 13. FIGURE 16 is a longitudinal vertical section through the container on line 16—16 of FIGURE 15.

FIGURES 17, 18 and broken 19 are longitudinal vertical sections through a container generally similar to that shown in FIGURE 1, but having membrane arrangements different from that of FIGURE 1 and different from each other.

FIGURE 20 is a view like FIGURE 17 showing a similar membrane in a modified container, and FIGURE 21 is a vertical cross section on line 21—21 of FIGURE 20. FIGURE 22 also is a view like FIGURE 17 showing a similar membrane installation in a further modified type of container, and FIGURE 23 is a central horizontal section through the container when empty, with parts broken away.

FIGURE 24 is a longitudinal vertical section through a container and membrane structure generally of the type shown in FIGURE 17, but having a different bottom construction. FIGURE 25 is a transverse section through such container and membrane on line 25—25 of FIGURE 24 and FIGURE 26 is a central horizontal longitudinal section through the container and membrane when the container is empty, part of the membrane being broken away.

FIGURE 27 is a vertical longitudinal section through a container generally of the type shown in FIGURES 17 to 19, but provided with a different type of membrane bottom construction, and FIGURE 28 is a transverse vertical section through the container taken on line 28—28 of FIGURE 27. FIGURE 29 is a central horizontal longitudinal section through the same container when the container is empty, having parts of the membrane broken away.

FIGURE 30 is a transverse vertical section through a container and membrane arrangement generally of the type shown in FIGURES 17 to 29, but with a different type of center section which can be used in any of the containers shown in such figures.

FIGURE 31 is a longitudinal vertical section through a container and membrane structure generally like that shown in FIGURES 17 to 29 incorporating a type of material moving structure in its central portion different from that in FIGURE 30, and FIGURE 32 is a vertical transverse s ection therethrough along line 32—32 of FIGURE 31. FIGURE 33 is a view similar to FIGURE 32 of a modification.

FIGURE 34 is an enlarged vertical transverse section along line 32—32 of FIGURE 31, showing a different construction, and FIGURE 35 is a detail section on line 35—35 of FIGURE 34.

FIGURE 36 is a side elevation of a marine type of container equipped with membranes of the present invention. FIGURE 37 is a plan of such a container, FIGURE 38 is an end elevation of the container and FIGURES 39 and 40 are transverse sections through the container on line 39—39 of FIGURE 36 showing different conditions within the container. FIGURE 41 is a fragmentary vertical section on line 39—39 of FIGURE 36 of a modified structure.

FIGURE 42 is a top perspective of another marine container embodying a membrane of this invention and FIGURE 43 is an end elevation of such container with parts broken away.

FIGURE 44 is a top perspective of a different marine container incorporating a membrane in accordance with this invention, and FIGURE 45 is an end elevation of the container.

FIGURE 46 is a top perspective of a fragment of anchoring mechanism for securing the edge portion of a membrane to a rigid wall for use in any of the membrane installations shown in the above figures. FIGURE 47 is an exploded top perspective of the anchor mechanism shown in FIGURE 46.

FIGURES 48 to 53 are transverse sections through different alternative types of membrane edge securing structure.

FIGURE 54 is a top perspective of a fragment of a double engagement membrane edge portion securing device usable with a construction such as shown in FIGURES 27, 28 and 29.

FIGURE 55 is a side elevation of a marine vessel with parts broken away, having membranes; FIGURE 56 is a transverse section on line 56—56 of FIGURE 55 and FIGURE 57 is a longitudinal vertical section through the vessel, one end being broken away.

While the various membrane installations in containers illustrated in the drawings are of different types, such installations have essentially one or more of three principal functions. The first function is that of constituting a vapor barrier and insulation element in a container. The second function is as an element for compacting or densifying material composed of fine discrete particles to increase the weight of material which can be accommodated in a given rigid or flexible container. The third function of the membrane installation is to facilitate unloading of discrete particle material or sludges or slurries from a rigid or flexible container by exerting controlled pressure on the material for moving it while, at the same time, if desired, protecting the container in which the membrane is installed from being subjected to an internal pressure below atmospheric pressure. These principles can be utilized whether the container is a stationary storage container of flexible or rigid character or a flexible or rigid transportation container, such as a tank, truck or tank trailer, or a buoyant marine tank, or a railway tank car.

The membrane installations of the present invention are especially concerned with containers for storing or transporting discrete particle material, which term is intended to embrace any material having reasonable flow characteristics including fine powdered material, such as flour or cement; granular material such as sugar, salt or sand; coarse particle material such as whole grain or corn kernels; chunky material such as pellets, pulp chips and briquets, and small objects such as corn cobs, fruit and vegetables, such as oranges and potatoes, which, while being of irregular shape, are nevertheless sufficiently rounded so that they will roll one on another. All of such products are included within the term discrete particle material because all of them have the characteristics of not being liquid, their particles not adhering into a mass and of forming a reasonably steep angle of repose when piled. It should be understood that the specific items mentioned are only intended as examples to illustrate material having the characteristics pertinent to utilization of the present invention.

A principal application for the present invention is in rail cars, which may take the form of either a tank car 1, shown in FIGURES 1, 2, 3 and 4, or hopper car 2, shown in FIGURES 6 and 7. In each of these applications of the invention a membrane $3a$ in FIGURES 1, 2, 3 and 4, and $3b$ in FIGURES 6 and 7 extends within the upper portion of the car container, preferably approximately the upper half of the car container, as a liner. The lower edge portion of this membrane is secured to the wall of the rigid container around the container periphery substantially in a horizontal plane. The membrane preferably is shaped generally complementally to the interior of the container so that it can fit the inner sides of the container walls reasonably contiguously. Thus, in FIGURES 1, 2, 3 and 4 the membrane $3a$ is of generally semi-cylindrical shape and the membrane $3b$ of FIGURES 6 and 7 is of generally rectangular pan shape. In both instances the membrane is reversible, without being detachable, so that it can move between a position lining the upper portion of the container and a position substantially inverted and sagging below the edge portion of the membrane secured to the container wall.

In each instance the membrane $3a$ and $3b$ should be of relatively strong and tough, very flexible sheet material, which preferably is inelastic. Such material may be a fabric rendered air impermeable and waterproof, such as neoprene coated nylon fabric, or the membrane can be of nonwoven material such as polyester resin sheet, available under the trade name Mylar. Such membrane materials are to be understood as merely representative. In each of the instances mentioned, however, when such a membrane is interposed between discrete particle material in the lower portion of the car and the rigid upper portion of the car shell, there will be only a very small air space above the liner, as shown in FIGURES 5, 6 and 7, when the container is loaded. Such air can carry only a small amount of moisture. The membrane barrier prevents the ascension of moisture from the material received in the container into contact with the upper portion of the container wall.

Normally, railway tank cars are made of metal and frequently railway hopper cars are metal. If flour, for example, is loaded into such cars and the exterior of their containers is subjected to low temperatures, warm moist air will rise from the material in the car into contact with the cold container wall so that such air will be cooled below the dew point and the moisture will therefore be precipitated from it onto the interior of the container wall. As sufficient moisture collects it will drip off the container walls as condensate to dampen the surfaces of the flour. This moist condition promotes mold, adhesion and other deterioration of the surface portion of the flour, which is undesirable. Such moisture condition will also produce an undesirable effect on other types of material which may be transported or stored in a container. Provision of the membrane barrier deters the occurrence of such condition because the membrane itself, even where it is in contact with the interior of the container wall, is a poor enough conductor of heat so that usually it will not chill air coming in contact with it sufficiently to precipitate the moisture from the air.

Further, the membrane $3a$ or $3b$ provides some insulation effect, tending to stabilize the temperature of the material in the container, especially if some dead air space is formed between the membrane and the rigid container wall. The contents of the container will tend to maintain a higher temperature than the atmosphere to which the container is subjected, if such atmospheric temperature is below freezing, so as to afford at least some protection against freezing of the container contents. Conversely, conduction of heat from the exterior of the container through the membrane is deterred, so as to decrease damage to the contents of the car which might result from its exterior being subjected to undesirably high temperatures. Particularly if the car is refrigerated the efficiency and hence, economy, of the refrigeration is increased.

While, as has been mentioned, it is essential that the membrane form a substantially airtight barrier within the container between opposite sides of the membrane it is convenient to load the container from the top. In order to place the load beneath the membrane, therefore, it is necessary for the material received in the container to pass through openings in the membrane. In FIGURES 1, 2, 3 and 4 filler openings 4 in the upper side of the container are shown as having upwardly projecting flanges encircling them. The membrane $3a$ is then provided with elongated necks 5 at locations along its length corresponding to the container filler ports 4. The ends of these necks can be drawn upward through the container ports, as shown in FIGURE 2, and folded reversely over the filler port flanges in which position the necks 5 can be retained by an elastic or clamping band 6.

In order to maintain the membrane necks 5 open during the filling operation the membrane may be pressed into substantially contiguous contact with the inner wall of the container by connecting a suction source to the opening 7 through the upper portion of the container wall in communication with the space between such wall and the membrane. As air is sucked out of this connection the atmospheric pressure within the container will press the membrane outward into engagement with the container wall to form a liner, as shown in FIGURE 2. Since the upper portion of the membrane neck 5 is secured to the filler port 4 flange the neck will droop in return-folded condition within the container, as shown in FIGURE 2.

With the liner $3a$ held in the position of FIGURES 1 and 2 material is loaded through the filler ports 4 into the car tank until it reaches a level generally like that shown in FIGURE 2. The suction applied to opening 7 can then be discontinued and fluid under pressure, in this particular case preferably being air, can be supplied to the opening 7 to press the membrane away from the tank wall. The membrane will be pressed against the material in the tank generally in the manner shown in FIGURE 3, so as to squeeze air from the spaces between the particles of the material which will escape through the ports 4. The material will thus be compacted and densified and thus reduced in volume. Suction can then again be applied to the connection 7 to draw the membrane back into the position of FIGURE 2 to enable additional material to be fed into the tank through the ports 4. After a substantial additional amount of material has thus been received in the car a supply of air under pressure again can be connected to the opening 7, or suction can be applied to a filler port 4 to press the membrane 3a down against the material to compact it further. This procedure can be repeated until the tank of the car has been virtually completely filled.

When the filling operation has thus been completed the securing ring 6 can be removed from the liner neck 5 and such neck can be contracted or twisted closed, bound and pushed down into the filler port. Such port can then be covered by a suitable cap 8, as shown in FIGURE 4. Instead of the liner having necks 5 it may be possible simply to provide a cover 9 for an opening in the membrane 3a, as shown in FIGURE 5. Preferably this cover is attached to the membrane at one point so as to prevent it from sliding into the space between the liner and the tank wall inadvertently. If such a closure is used a filling spout of suitable type should be provided to extend down through the tank loading port 4 into, or through, the liner opening.

Membrane 3b in the hopper car of FIGURES 6 and 7 is similar to the membrane 3a described above, and serves the same general function. In the case of a hopper car the loading ports 4 usually are staggered along the length of the car to enable the material to be supplied more readily to opposite sides of the container. The liner necks 5 can be like those described above and when the loading has been completed they can be bound and pushed into the upper portion of the car, as shown in FIGURE 6. In FIGURE 7 the liner openings are closed by covers 9, like that shown in FIGURE 5.

Usually such discrete particle material, if it is of powdered or granular character, is removed from a container by suction. FIGURE 4 illustrates the procedure of removing such material from the tank car 1 through the discharge port 10 by suction. During such operation either the opening 7 or the loading port 4 is uncovered to vent the space within the tank above the membrane 3a, which is in contact with the load. As the suction reduces the pressure within the material below atmospheric, the atmospheric pressure above the membrane 3a presses such membrane against the upper portion of the material, which presses the material toward the outlet. During this operation the inside of the tank's upper portion is not subjected to differential pressure because the pressure both inside and outside the container is atmospheric. Also, while the pressure in the lower portion of the tank is somewhat less than atmospheric the pressure on opposite sides of the material load is equal so that little or no tendency for the lower portion of the container to be deformed occurs.

It will be appreciated that as material continues to be withdrawn from the tank the membrane 3a continues to follow the upper portion of the material downward until the tank has been emptied completely. Consequently, it is necessary for the membrane to be reversible from the upwardly extending position in FIGURE 2 to substantially a corresponding downward position. For that reason the edge of the membrane must be secured circumferentially around the car tank, as shown in FIGURE 1, approximately in the horizontal central plane of the tank. If the membrane is to be of minimum extent the necks 5 should be long enough so that they will not be stretched undesirably when the membrane is pressed against the upper portion of the load of material in the tank to compact it. While such compacting is not necessary it is highly desirable, particularly in transportation tanks, in order to increase the density of the material and consequently increase the load of a given type of material which can be transported by a given tank vehicle. Also, by subjecting the membrane to differential pressure in which the pressure below the membrane is lower, and above the membrane is higher, the membrane will act to force material toward and through the discharge port, even though the material itself, such as chunky material, would not be moved readily by suction.

In FIGURES 8, 9 and 10 a storage tank 11 of a shape different from those of FIGURES 1 and 6 is shown having in it a membrane 3c generally comparable to the membrane 3a of the tank in FIGURE 1, and the membrane 3b in the tank of FIGURE 6. In this instance the tank would be used primarily for plant storage purposes, rather than for transportation, and is shown to be of cylindrical shape in which the axis of the tank extends vertically. The liner 3c is of generally cylindrical shape, having one end closed by a circular end portion, except for a central port which may have a neck 5. The end of the membrane liner opposite the circular end wall is secured circumferentially to the wall of the tank approximately midway between the upper and lower ends of the tank. Such tank has a filling port 4 located centrally in its upper end and of a diameter corresponding generally to the diameter of the membrane neck 5. The lower end of the container has in it a discharge port 10 and such container bottom may be of hopper shape to facilitate complete emptying of the tank.

The operation of the membrane installation, shown in FIGURES 8, 9 and 10, is similar to that described in connection with FIGURES 1, 2, 3 and 4. In FIGURE 8 the membrane 3c is shown as being pressed upward into substantially contiguous engagement with the inner side of the wall of tank 11 by atmospheric pressure within the tank as the opening 7 is connected to a suction source. After the tank has been filled while such suction remains applied, the neck 5 can be removed from the filling port 4 by taking off the retaining band 6 and the neck can be bound and pushed into the tank through the filling port, as shown in FIGURE 9. When material is being removed from the tank the opening 7 can be in communication with the atmosphere and the differential pressure on opposite sides of the membrane can cause the membrane to press against the upper portion of the material in the tank and follow it down as it is discharged.

The container liner installation, shown in FIGURES 8, 9 and 10, is not suited to compaction of the material at intervals because of the short length of the neck 5 extending from the liner to the filler opening. A longer neck could, of course, be used if desired, but even then it would be difficult to obtain such compaction of discrete particle material in the container if the container were less than half full of such material. Also, since the membrane 3c extends only approximately half way down the wall of the container, reliance could not be placed on this liner to assist in discharging the material completely from the container. The membrane arrangement shown in FIGURES 11 to 16, however, has the capability of compacting discrete particle material in the container, however full the container may be, of effecting complete emptying of the container and also serving to provide insulation and a moisture barrier between the discrete particle material in the container and the container wall.

In this form of membrane installation the membrane is composed of four sections including an upper section 3d and three lower sections 3e. The upper membrane section 3d is of generally circular shape having a neck 5 in its central portion, which can be pulled upward through the filler port 4 and folded over the flange of such port and secured in place by a band 6, which may be an elastic ring, as discussed in connection with the membrane and container disclosed in FIGURES 8, 9 and 10. There are preferably three lower membrane sections 3e which are similar to each other, and which are of cylindrically arcuate shape approximately 120° in extent complemental to the curvature of the cylindrical container 11. The length of such membrane sections corresponds to that portion of the height of the container 11 below the upper membrane section 3d. The upper edge portions of the membrane sections 3e are secured to the periphery of the upper membrane section 3d, so that, as shown in FIGURE 11, the three lower membrane sections 3e and the upper membrane sections 3d cooperatively will constitute a liner for the entire wall area of the container above its bottom. The bottom of the lower membrane sections 3e may be closed and the container bottom can be lined by a further membrane section 3f overlying the bottom of the container, of generally circular shape, and the peripheral edge portions of which are joined to the lower edges of the lower wall membrane sections 3e.

Figure 12:
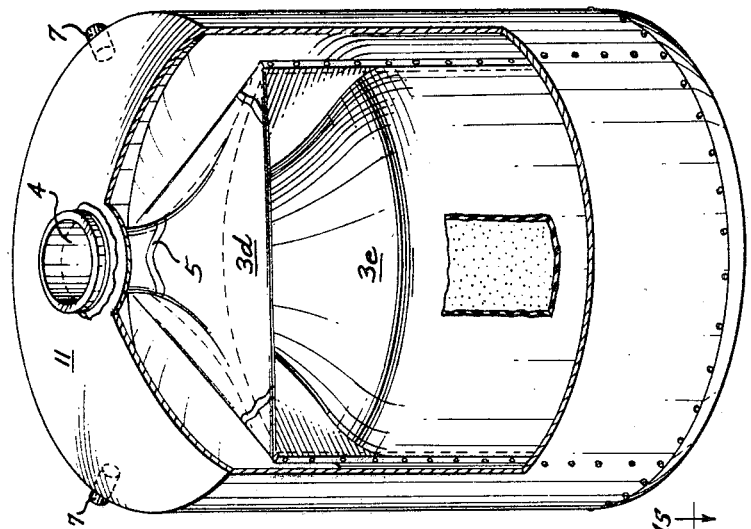
FIGURES 11, 12 and 13 are top perspectives of a container similar to that shown in FIGURES 8, 9 and 10, but having a different type of membrane installation, portions of the container and membrane within it being broken away. Such figures show the membrane in different conditions.

The upper membrane section 3d is secured to the container only by its neck 5 extended through and secured around the filler port 4. The bottom membrane section 3f has an opening 12 in its central portion corresponding in size and location to the discharge port 10 in the bottom of the container 11. Such diaphragm section opening 12 is suitably secured by a fluidtight joint around the periphery of the container discharge port 10. The edges of the three wall membrane sections 3e are secured to the container adjacent to each other at longitudinal locations spaced apart approximately 120°, as shown in FIGURES 12 and 15, for example. Such wall sections thus cooperate in forming a substantially cylindrical container liner complemental to the cylindrical container 11 and forming fluidtight partition means.

A suitable connection or connections 7 through the container wall provide for air or inert gas under atmospheric pressure, or at a pressure higher than atmospheric, to be supplied to the space or spaces between the membrane and the container wall. One of such connections is provided in each of the container wall sections across which a membrane section 3e is sealed. If combustible dust material is to be stored in the container, the explosion hazard during load or unloading can be virtually eliminated by filling the space between the membrane and the container wall with inert gas. Since such space is protected from contamination by dust material, the inert gas expelled or withdrawn from a connection 7 can be compressed or stored for reuse. Initially, suction may be applied to each fluid connection when the filler port 4 is open and the discharge port 10 is suitably closed, so that the atmospheric pressure within the membrane will press the various membrane sections into substantially contiguous engagement with the inner side of the container walls, top and bottom, as shown in FIGURES 11 and 14. With the liner membrane thus held in expanded condition discrete particle material can be supplied to the filling opening 4 to fill the interior of the membrane assembly.

When the container has been approximately one-half filled the filling procedure can be interrupted and air under pressure can be supplied to the connections 7 instead of suction. As the pressure on opposite sides of the membrane sections 3e becomes equalized the joints between the upper portions of the wall sections 3e and the periphery of the upper membrane section 3d will droop generally along chords of the container between the lines of attachment of the wall sections 3e to the container, so that the three chord lines will form generally an equilateral triangle, as shown in FIGURE 12. If air under pressure in excess of atmospheric pressure is then supplied to the connections 7 the membrane will be pressed against the discrete particle material to expel air from the interstices through the filler port 4 and the joint portions between the membrane sections 3e and the upper membrane sections 3d will be folded under along the chord lines, as shown in FIGURE 16. This discrete particle material will thus be densified at intervals during the container filling operation.

When the container has been filled completely with discrete particle material the neck 5 of the upper membrane section 3d can be released from the filler port, bound and moved downward through the filler port in a manner similar to that shown in FIGURE 9, so that the filler port can be closed by a suitable cap while the material is being stored. While the container is sealed the membrane 3d, 3e and 3f will function to a considerable extent as insulation for the contents of the container to deter its deterioration either from freezing or from being heated excessively. Also, as described above, the membrane 3d will deter condensation of moisture on the interior of the container top and will protect the material within the container from being dampened by any condensation which may occur within the upper portion of the container when it is subjected to low external temperatures.

When discrete particle material is to be discharged from a container equipped with a membrane installation such as shown in FIGURES 11 to 16, inclusive, the discharge port 10 will be opened and any suitable provision can be made for transporting the material away from the container. A differential fluid pressure should be established on opposite sides of the membrane installation and such differential can be established by applying a suction to the discharge port 10 and opening the connections 7 to atmosphere, or by connecting to the openings 7 a source of air under pressure higher than atmospheric, or both. In any case the filler port 4 will remain closed so that the membrane installation will be virtually fluidtight and will be substantially completely filled with discrete particle material at the inception of the discharge operation. The membrane will therefore be in substantially contiguous engagement with the body of material in the container.

The differential pressure on opposite sides of the membrane partition will cause the membrane to press against the discrete particle material, the effect of which will be to press such material toward the discharge port 10. As material is discharged from the bottom of the container the material will be moved generally downward by gravity to maintain the lower portion of the container reasonably well filled. Normally, the material would tend to be discharged first from the upper central portion of the container, but the effect of the differential pressure on the wall membrane sections 3e will be to press the material toward the center of the container so that the central portion of the liner in profile, as seen at the left of FIGURE 16, will form a reverse curve shape, the upper portion of which is convex at the material side and the lower portion of which is concave at the material side. The upper portions of the wall membrane sections will move progressively toward each other as material is discharged from the container until they abut in contiguity, as shown in FIGURE 15. The upper membrane section 3d will be collapsed onto the upper portions of the wall membrane sections 3e.

As material continues to be discharged from the discharge port 10 the inwardly convex upper portions of the membrane sections 3e will increase in extent and the lower inwardly concave portions of the membrane sections will decrease in extent as the membrane urges the discrete particle material from above toward a position overlying the discharge port 10. During this operation it will be evident from a comparison of FIGURES 12 and 13 in conjunction with FIGURE 16 that the membrane sections 3e will be peeled progressively from the container wall from the top down in a rolling type of motion to press the material toward the center of the container. When this peeling action has progressed to the lower edge of the wall membrane sections 3e the pressure on such sections will raise outer edge portions of the bottom membrane section 3f to continue the procedure of moving the material toward the center of the container over the discharge port. Where three wall sections 3e are provided, as shown in FIGURES 15 and 16, the edge portions of the bottom membrane 3f will be raised initially at locations spaced apart 120° and from these locations the bottom membrane will be progressively peeled from engagement with the bottom to follow the inward movement of the wall membrane sections 3e.

During the operation of emptying the container 11 in the manner described above, it will be evident that the wall membrane sections 3e are reversed or turned inside out as far as their material holding ability is concerned. Thus, when the container is filled with discrete particle material or is ready to be filled, as shown in FIGURES 11 and 14, the membrane sections 3e are inwardly concave; whereas, at the completion of the container emptying operation such wall membrane sections have been inverted to the positions shown in FIGURE 15 in which their inner sides are convex. Throughout the material discharge operation it will be evident that, despite application of suction to the discharge port 10 for the purpose of removing the material, no portion of the container 11 has been subjected to pressure below atmospheric pressure. On the contrary, the pressure between the membrane and the container is always equal to or higher than atmospheric pressure except when suction is applied to the connections 7 to move the membrane into substantial contiguity with the inner wall of the container, as shown in FIGURES 11 and 14. Even then, the membrane is pressed against the container wall by internal atmospheric pressure so that the container is never subjected to a higher external collapsing pressure.

If air under pressure greater than atmospheric is supplied to the connections 7 for the purpose of expediting discharge of discrete particle material from the discharge port 10, whether or not suction is applied to such discharge port, the container may be subjected to some degree of internal bursting pressure. For that reason it is desirable for the container 11 to be of cylindrical cross section so as to be able to resist such bursting tendency satisfactorily. The degree of pressure above atmospheric in the space between the rigid container and the membrane will affect, to some extent, the rate at which the material is discharged from the container. Also, of course, the degree of reduction in pressure applied to the discharge port 10 or the application of air under pressure to a discharge line connected to the discharge port 10 will affect the rate of material discharge.

If the discharge operation of the material is to be effected entirely by suction exerted on a connection to the discharge port, the lower the suction pressure and the higher the pressure above atmospheric between the membrane partition and the rigid container the greater will be the differential in pressure on opposite sides of the membrane and the greater will be the force with which the membrane presses on the material in the container. The actual flow of air through the discharge pipe under these circumstances will, however, be very low if no air is admitted to the discharge conveying line. If the material is of fine powdered character or granular, therefore, the material in the discharge pipe will be quite dense and can be conveyed through only a short distance. The distance over which such material being discharged can be conveyed in a discharge pipe by the application of suction can be increased greatly by admitting supplemental air to the discharge pipe at a location adjacent to the discharge port 10 of the container and perhaps at intervals along the pipe. Such supplemental air will loosen the powdered or granular material in the pipe to a greater or lesser extent and greatly accelerate the flow of material along the pipe and the distance over which it can be transported.

Alternatively, instead of applying suction to the discharge pipe connected to the discharge port 10 of the container, air under pressure can be supplied to the discharge pipe adjacent to the discharge port 10 and, if desired, also at intervals along the discharge pipe. Such air also will mix with powdered or granular material in the discharge pipe and will increase greatly the rate of flow of such material through the pipe and the distance over which the material can be transported. In some cases it may be desirable to combine the procedures proposed above by applying a suction to the extreme discharge end of a long discharge pipe and supplying air under pressure greater than atmospheric at or adjacent to the discharge port 10, and perhaps at intervals along the discharge line. With such an arrangement the velocity of flow through the discharge line and the length of the discharge line could be maximum.

Whatever may be the pressure of the air supplied to the discharge pipe at or adjacent to the discharge port 10, the pressure in the container between the membrane and the container wall at the side of the membrane opposite that engaged by the material will be greater than the pressure at the discharge port, so that the membrane will be pressed against the material in the container to urge it toward the discharge port. Moreover, whatever may be the differential in the air pressure at opposite sides of the membrane such pressure differential can be maintained until the entire contents of the container have been discharged because there is no possibility of the air supplied to the container through the connections 7 providing a sudden blast of air through the discharge line, as would be possible if the container were simply air-pressurized without provision of the partition membrane. Instead, at the end of the discharging operation the membrane sections are simply pressed together at the center of the container in the manner indicated in FIGURE 15, and pressed against the discharge port while containing within the container the air at pressure higher than atmospheric. Consequently, it is entirely practical to utilize the same pressure differential at opposite sides of the membrane until the very last material has been discharged from the container.

When the emptying operation has been completed the supply of air under pressure to the connections 7 is interrupted and suction again may be applied to these connections while air is admitted through the discharge port 10. The differential pressure thus applied in reverse to the membrane will distend it again into the position shown in FIGURES 11 and 14. The filler port 4 may then be opened and the neck 5 pulled out through it for securement in the manner shown in FIGURES 11 and 16 preparatory to the container being filled again.

A different type of membrane installation capable of being manipulated in a manner comparable to that described in connection with FIGURES 11 to 16, but applicable to a horizontally elongated container, is shown in various embodiments in FIGURES 17 to 32, inclusive. In FIGURES 17 to 32 the container 12 could be used as a stationary in-plant storage container or a marine vessel or a land transportation container such as a tank car, a tank truck, a semitrailer tank or a trailer tank. Because of the elongated character of the container it is desirable for it to have a plurality of filler ports 4 spaced along its length and a plurality of discharge ports 10 which may correspond in location to the filler ports lengthwise of the tank. It is preferred that the tank be divided into a plurality of compartments by fixed rigid transverse partitions 13 located substantially midway between adjacent filler ports and discharge ports. While only one such partition is shown in the tanks of FIGURES 17 to 31, additional partitions could be provided if a longer tank were used or if it were desired to provide shorter compartments within the tank. Such partitions may be perforated to afford fluid intercommunication between the compartments.

In each of the various tank compartments a plurality of flexible membrane partitions are provided which conform to the internal shape of the container so that in one position a membrane section will serve as a liner for a portion of the tank. The membrane can be moved to and held up in such lining position, however, only by exerting on the liner a greater fluid pressure on its side away from the container wall than on the wall side. In FIGURES 17 to 31 the tank is shown as being of cylindrical shape and cup-shaped membrane elements also are substantially cylindrical or in the shape of a cylindrical section, and are reversible to turn inside out, in effect, as are the membrane sections 3e, described above. In each instance membrane sections are located at opposite sides of the circumferential band of the tank where the filler port 4 and the discharge port 10 are.

In FIGURE 17 the cylindrical cup-shaped membrane section fitting each tank end has a curved end, whereas the bottoms of the membrane sections abutting the fixed partition 13 are planar. Such membrane sections are otherwise of similar shape. The peripheral edges of such membrane sections are suitably secured by fluid-tight joints 14 extending circumferentially of the container adjacent to the filler port 4 and the discharge port 10 in each instance. Each membrane element may then shift its position relative to its edge joint 14 from a position in which it constitutes a liner for one portion of the tank into a reversed position where the side of the membrane which was convex when the membrane was a liner has become concave, and the side of the membrane which was concave at the time it functioned as a liner has become convex.

As shown in FIGURE 17, connections or openings through the wall of the container 12 are provided in the wall portions of the container to be engaged by the membrane sections 3g as liners. By connecting a suction source to an opening 7, therefore, the membrane section 3g for the corresponding portion of the container can be pressed by air under higher pressure at the opposite side of the membrane into substantially contiguous engagement with the container wall. In order to supply adequate air under pressure for this purpose it may be necessary to open a filler port 4 or a discharge port 10. When a section of the container is to be filled with discrete particle material both of its openings 7 are connected to a suction source, or such openings are vented and pressure fluid supplied inside the tank section, so that both membrane sections 3g are moved into tank lining position, as in the right compartment of the tank shown in FIGURE 17.

With the discharge port 10 closed by a suitable cover and the filler port 4 open the compartment of the tank 12 can then be filled with discrete particle material. Particularly if such material is of the powdered or granular type the filling operation can be interrupted at intervals, especially after the compartment is more than half full, and a source of air under greater than atmospheric pressure can be connected to the openings 7 instead of a suction source or sources. The membranes 3g will be pressed away from the container walls by such fluid pressure and pressed against the material in the compartment to squeeze out air from between the particles of the material and pack and densify it. Such successive packing operations will increase greatly the weight of material which can be received in a container compartment. It probably will not be possible to fill the compartment completely because of the elongated character of the compartment completely because of the elongated character of the compartment, but the upper surface of the load may assume a position generally as indicated in the right compartment of the tank shown in FIGURE 17.

When it is desired to unload the container the membrane sections 3g are operable to facilitate and expedite the unloading operation generally in the same manner as the membrane sections 3e, described in connection with FIGURES 11 to 16. The action of these membrane sections is illustrated in the left compartment of tank 12, shown in FIGURE 17. While there is no discharge conduit shown connected to the discharge duct 10 in this figure or other figures it will be understood that normally such a conduit would be connected to the discharge port. Consequently, a suitable valve arrangement normally would be provided in the discharge port which would be closed while the cover is being removed from the discharge port 10 and the discharge duct is being connected.

When the load is to be discharged from a compartment the valve in the discharge port 10 is opened and usually either suction or compressed air or both is supplied to the discharge conduit, as has been discussed above. Even if a source of suction were connected to the openings 7 to hold the membrane sections 3g in tank wall lining position material directly above the discharge port 10 would be discharged through it until the discrete particle material at opposite sides of the discharge port has reached a natural angle of repose. The problem is then to move the body of material of generally rectangular cross section, as shown in the right end of the left compartment in FIGURE 17, into a position to drop through the discharge port 10.

When a tank compartment such as shown at the right of FIGURE 17, or a container, equipped with elements 3g, is to be unloaded, air, preferably under pressure, is supplied to one of the openings 7. Unless suction is applied to the discharge port 10, such air must be under pressure. The higher fluid pressure acting on the side of the membrane section 3g opposite the discharge port will press the membrane in the corresponding end compartment down against the material and toward the outlet 10. As shown in the left end of the left compartment of FIGURE 17, the pressure behind the left membrane section will urge it into a reverse curve shape, so as to roll the upper part of the pile of material in the left end of the container compartment toward a position above the discharge port 10. It should be noted particularly that it is not necessary for the material to be lifted by such reverse curve rolling of the membrane section, but such section shifts the upper portion of the body of the material principally laterally. As material continues to be urged toward a position over the discharge port 10 the upper portion of the membrane element is peeled inwardly from the wall of the container, as indicated at the left of FIGURE 17. The weight of the material holds the lower portion of the membrane element down, while the upper portion of the element continues to bulge progressively farther to the right.

Such fluid pressure differential can continue to be applied beneficially to the membrane until enough of the contents in such end of the compartment has been discharged so that a considerable portion of the membrane will bear against the standing face of the material in the opposite end of the compartment, as shown by line A in FIGURE 17. Air, again preferably under pressure, will then be supplied to the connection 7 of the other compartment end, while reducing the fluid pressure between the container wall and the first membrane section to a value below the pressure within the container. A suction source at a pressure lower than any suction applied to the discharge port 10 can be connected to the first opening 7, or such first opening can be vented if the tank interior is pressurized. Consequently, the first membrane section, at the left of FIGURE 17, will be pressed back again into a container lining position such as shown in the right end of the left compartment in FIGURE 17.

When differential fluid pressure is thus applied to the right membrane section 3g, its upper portion in turn is urged toward the central portion of the left container compartment in FIGURE 17 and moves material to a position over the discharge port 10 until eventually it assumes a position fully to the left of its edge connection to the container when all of the material has been moved out of the right end of the left compartment. The right opening 7 is then subjected to a pressure lower than that within the central portion of the container compartment so that the latter pressure will press the right membrane element 3g to the right back again into lining relationship to the tank wall. Air, preferably under pressure, is then again supplied to the opening 7 communicating with the left end of the left compartment in FIGURE 17 so that the left membrane section will again be urged to the right away from its container lining position in a reverse curve shape as shown in FIGURE 17. By this action the upper portion of the body of material in the left end of the container compartment at the left of partition 13 will be rolled to the right into a position above the discharge port. The left membrane section will bulge progressively farther to the right, beyond the position A, because the right end of the compartment is empty, and be peeled progressively from the left end of the container compartment, until this membrane section has moved through position B and has reversed completely or been turned inside out in position C.

While theoretically such second manipulation of the left membrane section in the container formed by the left compartment of the tank 12 in FIGURE 17 will have moved all the material in the left end of the container into the discharge outlet, actually the lower portion of this liner may have rolled in return bent shape across the outlet as indicated at 15 in FIGURE 17, so that some of such material will have been transferred onto the lower portion of the right membrane section 3g. When the left membrane has been reversed completely, therefore, it will be desirable to connect a suction source to the opening 7 communicating with the left end of the left compartment in FIGURE 17 and vent the container, or pressurize the container and vent left opening 7, so as to effect movement of the left liner membrane section 3g back into container lining position. A source of air under low pressure is then connected to the right opening 7, so that the right membrane section will move gently through the reverse curve shape like that shown in FIGURE 17 into completely reversed position. This further manipulation of the right membrane section may empty completely the left compartment of the tank, but some material may be transferred back onto the left membrane section and can be cleaned out manually.

The right compartment of the tank 12 shown in FIGURE 17 can be emptied in the same manner as the left compartment. When both compartments have been emptied suction sources can be connected to the openings 7 to return the membrane sections to their container lining positions. The valve in each discharge port 10 can then be closed and a cover applied to it preparatory to the tank being filled again.

While the membrane sections 3g of FIGURE 17 are shown as having edge portions lying in a plane perpendicular to the axis of the tank and of such cup-shaped elements, it is not necessary that the membrane edge be located in such a plane. Thus, in FIGURE 18 the circumferential edges of the cup-shaped membrane elements 3h are shown as being disposed in planes inclined relative to the axis of the tank and the cup-shaped membrane elements. Such membrane edge plane is shown as being inclined upward away from the discharge port 10 in the bottom of the container, but the inclination of such plane to vertical must not exceed about 30°. Otherwise the membrane will be unable to deflect far enough toward the outlet to displace material into a position for gravity discharge through the outlet. Alternatively, the edge of each membrane section could be disposed in a plane inclined in the opposite direction so that the upper portion of the membrane section in each instance would be located close to a filler port 4, while the lower portion of the membrane edge would be spaced a substantial distance from the discharge port 10. The function and operation of the membrane section would be in general the same as described in connection with the membrane sections 3g of FIGURE 17.

In the partition membrane arrangement shown in FIGURE 19 cup-shaped membrane sections 3g of the type shown in FIGURE 17 are utilized as the basic membrane elements. To upper segments of the membrane elements 3g are attached additional membrane elements 3i, which overlie the sides of the mmebrane elements 3g opposite the container wall. Such liner segments 3i have their edges connected to the main membrane sections 3g in a plane inclined from a location adjacent to the filler port 4 downwardly away from the joint 14 of the membrane sections 3g with the container 12. As before, openings 7 communicating with the space between the container wall and the membrane sections 3g are provided, and an additional connection 7' establishes communication between the exterior of the container 12 and the space between the two membrane elements 3g and 3i through the joint 14.

In using the double membrane element installation shown in FIGURE 19 both membrane elements can be pressed into the container lining position shown at the right of FIGURE 19 by connecting a suction source to both openings 7 and 7'. The container can then be filled through the filler port 4, as discussed previously. When the container is to be unloaded the suction connections will be made to both openings 7 and an air pressure connection will be made to one or both of the connections 7'. Such air under pressure will press the membrane section 3i away from the membrane section 3g to which it is connected, and in doing so will roll material from the upper portion of the body toward a location above the discharge port 10. The membrane section 3i in each instance will pass through a reverse curve shape until it has been extended to its extreme position of separation from the membrane section 3g, shown in dot-dash lines.

If air under pressure is supplied to both openings 7' simultaneously the two membrane sections 3i will abut at the center of the container as material is discharged from both ends of the container generally comparable to the abutment of the membrane sections 3e discussed in connection with FIGURE 15. It is probable that somewhat more material will be discharged from the container if air under pressure is supplied through both openings 7' simultaneously, instead of through one or the other of such connections alternately. In either instance, however, suction sources may be connected to the openings 7 so that the membrane sections 3g will be held in their container lining positions. It will be seen from FIGURE 19 that with the membrane sections 3g held in their container lining positions it is impossible for the membrane sections 3i to obstruct the passage through the discharge port 10, even if the space between both membrane sections 3i and their associated membrane sections 3g are inflated by air above atmospheric pressure.

When the maximum amount of material has been discharged by displacement of the membrane sections 3i relative to the membrane sections 3g, openings 7' can be connected to suction sources so that the membrane sections 3i and 3g of each membrane unit will be pressed tightly together and will function as a single membrane element. Alternatively, the connections 7 can then be supplied with air under pressure to complete the discharge of material from the container by a procedure similar to that described in connection with FIGURE 17. After all the material has been discharged from the container the double element membrane unit can be moved back into container lining position by connecting a suction source to each of the connections 7 and 7'.

In some instances it may be found that when air under pressure is supplied to a connection 7 communicating with the space between a wall of the container 12 and a membrane section 3g, the membrane may tend to peel from the container wall lower portion nearer the discharge port 10 before it peels from the lower portion of the container at a location farther from the discharge port because of the fluid pressure beneath the membrane. Thus the lower portion of the membrane may assume a reverse curve shape, as indicated by line A in FIGURE 17, forming a pocket next to the discharge port in which discrete particle material is trapped. As the membrane is moved from position A to position B, its lower portion will tend to roll across the discharge port and obstruct it while such portion carries a small quantity of discrete particle material into the opposite end of the compartment. Reversing the fluid pressure on both membrane sections may simply result in approximately the same amount of material being similarly carried back into the first compartment end. To deter such rolling of the lower membrane portion across the discharge port, ribs 16 are shown in FIGURE 20 on the container bottom, at least at one side of the discharge port, forming grooves between them into which the lower portion of the membrane will sag. If there is sufficient material on the membrane such ribbed formation may produce sufficient resistance to prevent the membrane from rolling into the reverse curve shape 15 shown in FIGURE 17.

In FIGURE 22, a more positive arrangement for deterring lifting and rolling of the membrane lower portion is illustrated. In this instance parallel longitudinal ribs 17 extending lengthwise of the container and spaced transversely of it connect the ends of ribs 16, as shown in FIGURE 23, so the ribs form a row of pockets instead of simply grooves. A suction source connection 18 to each pocket produces suction on the membrane exceeding any suction applied to the discharge port. Thus a fluid pressure differential is exerted on the lower portion of the membrane section 3g opposite that on the upper membrane portion which presses it away from the upper portion of the container. The degree of suction applied to connections 18 beginning farther from the discharge port 10 can be reduced or discontinued progressively so that the membrane can be peeled progressively toward the discharge outlet.

Instead of the elements formed by ribs 16 and 17 in FIGURES 22 and 23 being suction pockets, they can be electromagnetic units magnetizable to attract magnetic elements incorporated in the lower portion of the membrane section 3g. The magnetic attraction on the membrane magnetic elements will hold the lower portion of the membrane in contact with the container bottom. Such magnetizable elements can be deenergized sequentially beginning with the units farthest from the discharge port to enable the lower portion of the membrane to be peeled toward the discharge port.

FIGURES 24 to 29 show other expedients for insuring that the lower portion of the membrane will be peeled progressively from the container bottom, instead of rolling toward the discharge port 10 and forming a return bend 15 as shown in line B of FIGURE 17. The lower portion of the membrane, at least at one side of the discharge port, can be stiffened temporarily at will in controllable fashion by providing in it inflatable pockets adjacent to the discharge port. These are connected to a source of fluid, preferably air, under pressure to inflate and thus rigidify the membrane.

In FIGURES 24, 25 and 26 the pockets 19 are elongated circumferentially of the membrane element, as shown best in FIGURES 25 and 26, and are disposed in edge-to-edge relationship, as shown best in FIGURES 24 and 26. Fluid under pressure is supplied to these pockets through connections 20 and such pockets may be interconnected so that air flows from one pocket into the next pocket to effect simultaneous inflation of all of such pockets, or the pockets may be inflated separately. In any case deflation of the pockets can be effected or controlled sequentially so that the compartments are deflated in succession starting with those farthest from the outlet, as shown at the right of FIGURE 24.

In FIGURES 27, 28 and 29 the pockets 21 in the lower portion of the membrane element 3g are elongated longitudinally of the container. Each pocket is therefore straight and the row of pockets in side-by-side relationship is of arcuate shape. Fluid under pressure is supplied to these pockets by a connection 22 and the pockets of the series are in communication with each other so that all of the pockets are inflated at the same time to provide a rigid inflated section. The pockets are preferably tapered in thickness away from the discharge port 10, as shown in FIGURE 27, and each pocket may be tapered in width from the discharge port. Such tapering facilitates curling of the pocket group beginning at the end farthest from the discharge port when such sockets are partially deflated. Alternatively, these pockets, or the transverse pockets of FIGURES 24, 25 and 26, when loosely filled with beads of metal, glass or plastic, as shown in FIGURE 28, can be rigidified by partial evacuation and their flexibility restored by bleeding air into them again.

It will be noted that the portion of the bottom of the membrane section 3g which is rigidified by inflation of a row of pockets need not be very extensive, its function being simply to prevent the membrane lower portion from starting to roll into a return bend over the discharge outlet 10, instead of being peeled progressively from the container wall. Instead of the inflatable pockets being elongated simply lengthwise of the membrane section, as shown in FIGURES 27, 28 and 29, or circumferentially of the membrane section, as shown in FIGURES 24, 25 and 26, a double layer of inflatable pocket rows can be provided in crossed relationship, the pockets in one row being elongated lengthwise of the container and the pockets in an overlying row being elongated circumferentially of the container. Whichever type of rigidifying inflatable pocket area is provided such portion of the membrane element can simply be deflated in a controlled manner progressively toward the discharge port 10 near the end of the material discharging operation to enable the bottom portion of the membrane to be peeled progressively from the container bottom without rolling into a return bend shape.

By use of the various forms of membrane installation described material in a container can be moved into the space between the joints 14 securing the edges of adjacent membrane sections to a rigid container. Most of the material thus moved into registry with the discharge port lengthwise of a horizontally elongated container will be discharged readily through such port. Where the container is of cylindrical cross section, however, and the discharge port 10 has only a small extent circumferentially of the container, it would be possible for some material to lodge between the joints 14 and circumferentially adjacent to the discharge port without passing through it. To prevent this possibility a discharge port 10', such as shown in FIGURE 30, can be provided which has a circumferential extent sufficiently great to prevent any material lodging on the bottom of the container circumferentially adjacent to the discharge port. In such a construction side walls 23 and end walls 24 are provided, which are arched so as to provide sufficient stiffness to prevent collapse or bulging of the discharge duct funnel when it is subjected to a high degree of interior suction or pressure.

If the discharge port were enlarged both circumferentially and axially of the container to remain circular instead of being extended only circumferentially, as in the duct 10' of FIGURE 30, the material could not lodge between the joints 14 and could be discharged through a spout of conical shape having a single wall. Such wall would withstand a pressure differential produced by the internal pressure being either greater or less than atmospheric pressure.

Flow of material from between the membrane joints 14 through even the small outlet 10 can be insured by using one of the expedients shown in FIGURES 31 and 32, or FIGURE 33, or FIGURES 34 and 35, without enlarging the discharge port. Each of these expedients includes material dumping structure located in the same circumferential zone of the cylindrical tank 12 as the discharge port 10, which structure is arranged to bridge the lower arcuate portions of the container at opposite sides of the discharge port for the purpose of changing the effective shape of such portions of the container wall generally to arcuate curves of greatly increased radius or to chords of such arcuate portions of the container.

In FIGURES 31 and 32 bands of interconnected inflatable pockets 25 are provided at opposite sides of the discharge port 10. The lower end of each band is secured by a joint 26 to the container wall adjacent to the discharge port and the upper end of the band in each instance is secured to the container wall by a joint 27. When the pockets are deflated the band is of a length to line the container wall between the joints 26 and 27, as shown at the right of FIGURE 32. Inflation of the pockets 25 by fluid under pressure supplied to the connection 28 will cause the side walls of the pockets to bulge so that the row of pockets is shortened sufficiently to increase greatly the radius of curvature of the row of pockets or even to arrange them in a linear chord of the container, as shown at the left of FIGURE 32. Thus, when the pockets have been inflated the inclination of the band will be sufficiently steep despite the grooves between the pockets so that the material cannot remain alongside the discharge port, but will be expelled through the port. Membranes 29 can be flexibly secured between the edges of the band formed by the row of pockets and the container wall to prevent material from lodging behind the inflatable pocket band.

The construction shown in FIGURE 33 includes an upper inflatable pocket 25 having its axis extending lengthwise of the container, like the pockets 25 of FIGURES 31 and 32, but between this pocket and the discharge port 10 are connected a plurality of pockets 25' in side-by-side relationship having their axes extending generally chordwise of the container. Such pockets 25' may taper in thickness toward opposite ends from generally their central portion, bulging of the walls being restricted by internal webs, if desired. When the pockets 25 and the pockets 25' are inflated simultaneously, preferably by air under pressure, as shown at the left of FIGURE 33, inflation of the pockets 25 will shorten the extent of the assembly between the location of attachment to the side wall of the container and the attachment adjacent to discharge port 10. Also, inflation of pockets 25' will move the inflatable assembly toward a chordal position. The curvature of the upper pocket 25 will assist initiation of movement of material lengthwise of the pockets 25'.

In FIGURES 34 and 35 the band 30 is similarly arranged in the circumferential zone containing the discharge port 10. This band also is of the inflatable type but instead of being formed as a row of pockets this band includes two surface sheets 31 and 32, as shown in FIGURE 35, which are interconnected by threads 33 of equal length, so that when fluid under pressure is supplied between the sheets 31 and 32 such sheets will move apart to the limit permitted by the lengths of the threads 33 and the strip will become rigid. In this instance, however, the length of the strip will not be altered appreciably, so that as the strip moves from the deflated condition at the left of FIGURE 34 to the inflated condition at the right of that figure, the curved length of the strip in deflated condition will be substantially equal to the length of the straight strip in inflated condition. The upper or lower edge of each strip is anchored by a flexible joint 34 to the container wall and the opposite edge of such strip must be secured to the wall by means capable of moving along the wall away from the anchored edge as the strip is inflated. Membrane panels 35 extending between the inflatable strip 30 and the wall of the container close the space between the strip and the container wall in all positions of the inflatable strip so as to prevent the accumulation of material from the load in the space between the strip and the container wall.

The structures shown in FIGURES 31 to 35 have been illustrated as being arranged to move discrete particle material from the lower quadrants of a cylindrical container toward the center of the container over a short distance lengthwise of the container in each instance, but it will be understood that the same type of structure could be extended to any length along the container for the purpose of moving material toward the central portion of the container. Thus, for example, the discharge port 10 could be elongated lengthwise of the container, to any extent desired, as a slot through which movement of the inflatable chordal elements could effect discharge of material. Alternatively, such elements could dump material onto conveying means extending lengthwise of the container such as a trough containing a screw conveyor or an endless belt or flight conveyor, or a mechanical or fluid vibratory or pulsating surface. Dumping of material into the central portion of the container can be facilitated by pulsating the air which inflates such chordal members. Also, such chordal members could be located behind membranes, if desired, which in the forms of device shown in FIGURES 32 and 33 would provide a smooth outer surface.

In FIGURES 36 to 45, inclusive, the present invention is shown as applied to a marine vehicle. Such a vehicle can be designed to be towed, as is the vehicle of FIGURES 36 to 41, or the vehicle can be self-propelled or propelled by one or more special tug units. In either case it is preferred that the vehicle float principally, if not completely, submerged. The vehicle includes a tank 36 preferably having a rigid shell or a shell which can be made rigid, such as by being composed of a double layer or flexible material interconnected to define an inflatable space between the walls. The effect of inflation is to stiffen the walls so that an essentially rigid wall structure will result. The buoyancy of such a tank can be adjusted by filling a portion of such innerwall space with fluid in the form of liquid, instead of gas. Disposition of such liquid at the bottom of the tank will serve as ballast.

Additional buoyancy can be afforded for the tank 36 by providing a supplemental shell 37, shown in FIGURES 36 to 40, enclosing the upper portion of the tank 36 in generally streamline form. Preferably such supplemental shell is a rigid wall, but such wall can be flexible or can be rigidifiable to a particular shape by being formed of spaced sheet elements which are interconnected and the space between which can be filled with fluid to stiffen the wall structure. Location of such a supplemental shell in a position enclosing the upper portion of the tank 36, as shown in FIGURES 36 to 40, provides buoyancy so that the tank will always float in a predetermined upright position. One or more tank filling ducts 38 extend upward from the tank, the number of such ducts depending upon the shape of the tank. If the tank is of horizontally elongated shape such as shown in FIGURES 36 and 37 several of such ducts should be spaced along the length of the tank, three being shown in these figures. Such ducts will extend upward through the supplemental shell 37, as shown in FIGURES 39 and 40, if such a shell is provided.

An outlet 39 for the tank 36 is shown in FIGURE 36 as being located in the tank bottom near one end. Discrete particle material can be moved longitudinally of the elongated tank bottom toward the outlet 39 when the tank is in horizontal position by providing a rapidly vibratory or pulsating strip 40, or other conveying means, extending along the tank bottom on which material within the tank can lie. Such a strip can be mechanically vibrated or can be of inflatable construction and the gas used to inflate the strip be subjected to pulsations. Movement of discrete particle material lengthwise of the tank toward the outlet 39 near one end of the tank can be expedited by altering the trim of the tank so that it is inclined downward toward such outlet. The trim can be altered by providing transverse partitions 41 within the supplemental shell 37 and providing liquid in a compartment formed by such partitions adjacent to the outlet end of the tank.

From the outlet 39 a hose 42 can extend upward around an end of the tank to a discharge connection 43 at the top of the tank. Suction can be applied to such discharge connection or air under pressure can be supplied at the outlet 39, or both, in order to propel the material through the hose 42. In addition, discharge of material from the tank 36 can be expedited by properly manipulating membranes 3h provided in the tank as partitions. Such membranes extend lengthwise of the tank 36, as shown best in FIGURE 40, and are disposed generally upright. The upper edges of such membranes are connected to the upper wall of the tank by joints 44 spaced transversely of the tank and located at opposite sides, respectively, of the tank filling ducts 38. The lower edges of these membranes are connected to the lower portion of the wall of tank 36 by longitudinal joints 45 located at opposite sides of the vibratory strip 40.

The membranes 3h are sufficiently full and the edge joints 44 and 45 are located in positions such that the membrane elements 3h can move between positions serving as liners for the inside of the tank, as shown in FIGURE 39, and inverted positions, as shown in FIGURE 40, in which the membranes abut generally in the central portion of the tank. The positions of such membranes within the tank can be altered by supplying fluid, either gas or liquid, to the spaces between the tank wall and the membranes. Connections 46 are provided through the wall of the tank 36 for the purpose of supplying or removing such fluid. Thus, if a low pressure or suction source is connected to the connections 36 while fluid under higher pressure fills the tank inwardly of the membranes 36, such membranes will be moved outward into the tank lining positions of FIGURE 39. If the upper ends of the filling ducts 38 are located above the external water level discrete particle material can be loaded into the interior of the tank through such ducts until the tank is substantially filled, as shown in FIGURE 39. Usually such material will be heavier than water so that it will be necessary to provide buoyancy for the tank even to float in fully submerged condition near the surface of the water. Such buoyancy can be achieved by supplying gas between the supplemental shell 37 and the upper wall portion of the tank 36 or in an inner wall space of the tank 36 itself if it is of double wall construction.

During the filling operation the material within the tank can be compacted periodically, if desired, to increase the effective capacity of the tank 36. Such compaction can be accomplished by supplying to the connections 46 fluid under pressure greater than the fluid pressure inwardly of the membranes 3h. The fluid used to exert such pressure can be either gas or liquid, but the type of fluid used should be selected to avoid upsetting the buoyant characteristics of the tank as a whole. When the tank has been filled the upper ends of the filling ducts 38 can be closed by suitable watertight covers 47 so that the tank can be towed by a towline 48 floating either low in the water or somewhat submerged without the contents of the tank being contaminated by access of water to such contents.

When the tank has reached its destination the contents of the tank can be discharged through the outlet 39, hose 42 and connection 43, as mentioned above. To expedite such discharge fluid under pressure, either gas or liquid, can be supplied to the connections 46 so that the membranes 3h will be displaced in generally S-shaped or reverse curve form from the lining position shown in FIGURE 39 toward the abutting position shown in FIGURE 40. Fluid under pressure can be supplied to connections 46 at opposite sides of the tank simultaneously or alternately to manipulate the membranes generally as discussed in connection with FIGURES 11 to 16, or generally as discussed in connection with FIGURES 17 to 29. If the connections 46 are simply vented and suction is applied to the discharge connection 43 the walls of the container 36 would not be subjected to internal pressure, but would be subjected to the external pressure of the water in which the tank floats. Consequently, it is preferred that positive pressure be supplied to the connections 46 or that they be vented to atmospheric pressure or opened to water pressure so that the pressure on opposite sides of the wall of tank 36 will be approximately equalized.

As the fluid or particle material is emptied from the container 36 the membrane elements 3h will move progressively into the mutually supporting abutment relationship shown in FIGURE 40. Near the end of the material discharging operation the lower portions of the membranes will tend to close over material lying on the vibratory strip 40, which would deter progress of the material along such strip to the outlet 39. To prevent such interference with discharge of the last portion of the material from the container the membranes may be provided with inflatable pockets 49 adjacent to their lower edges and extending lengthwise of the container generally parallel to the lower edges of the membranes. Inflation of such pockets by gas or liquid will spread the liner portions below the pockets and provide an unobstructed passage along the strip 40 to the outlet 39.

In FIGURE 41 membrane partitions 25', similar in construction to the walls 25 in FIGURE 32, are shown. When the pockets of such partitions are deflated the partitions will lie in the broken line location lining the opposite sides of the hull 36. When the pockets are inflated their bulging will shorten the width of the partitions so that they are moved toward the chordal position shown in full lines in FIGURE 41 to urge the contents of the container to a location above the unloading strip 40. At the same time fluid such as water can be admitted to the space between the hull and each partition. The ends of such partitions will be connected by webs 26' at opposite sides of the filling ports 38 and at opposite sides of the unloading strip 40, respectively.

In FIGURES 42 to 45, inclusive, the container 36' again may be of the rigid wall or inflatable wall type, but is shown in FIGURE 43 as being of double wall construction. Both of such walls can be rigid or such walls can be of flexible material interconnected, as described above, and in either case the interwall space can be filled with fluid which may be liquid or gas or some combination of the two, depending upon the buoyant characteristics desired. In these figures the tank is shown as being considerably longer in proportion to its width than that of FIGURES 36 to 40. A larger number of filling ducts closed by covers 47 is therefore provided, five being indicated in each instance.

Also, in this construction no supplemental upper shell of the type shown in FIGURES 36 to 40 is included, but sufficient buoyancy is provided by supplying gas to the interwall space of the tank 36' and by adding to such buoyancy of the tank the buoyancy of a gas filled submarine propulsion unit 50 or propulsion units 50'. The propulsion unit 50 shown in FIGURES 42 and 43 is connected to the tank 36' by struts 51 which may, if desired, actually provide an intercommunicating passage or passages between the propulsion unit and the tank. In FIGURES 44 and 45 the two submarine propulsion units are connected by struts 51' to the tank 36' at locations spaced circumferentially of the tank, as shown best in FIGURE 45. The submarine unit 50 in FIGURE 42 and one of the submarine units 50' in FIGURE 44 can be manned and equipped with suitable propulsion and control mechanism for driving the container 36' through the water in submerged condition.

The composite vehicles of FIGURES 42 and 43 and of FIGURES 44 and 45 are thus self-propelling, the propulsion force exerted by the tug units 50 and 50' being transmitted to the tank 36' by the struts 51 and 51', respectively. The buoyancy of the composite vehicle can be controlled from the propulsion unit by providing gas under pressure from a propulsion unit through one or more of the struts 51, 51' to the interwall space of a tank 36' to expel liquid from such space for increasing the buoyancy of the composite vehicle. The propulsion and control mechanism provided for the tug submarine units 50 and 50' can be such as conventionally used in submarines generally. Also, the struts 51 can attach the submarine tug units and the tanks together permanently or the struts 51 can be provided with suitable sealing structure at one end or the other so that a tug can be detached from one tank and attached to another tank of similar character. While the tank 36' is detached from its tug unit or units it can be filled with cargo or its cargo can be emptied, or moored, loaded or ballasted in a submerged or floating condition.

The internal construction and material compacting and emptying structure of the tanks 36' will be similar to that of the tank 36 described in connection with FIGURES 36 to 40, including membranes 3h and discharge hose. All of the vessels of FIGURES 36 to 45 should be filled either with cargo of discrete particle, sludge, slurry or liquid type, or with ballasting liquid, while under way or moored in rough water, to prevent the hull from being subjected to bending stresses which might damage or rupture the shell. If desired, the hull or its contents may actually be pressurized to increase the rigidity of the vessel.

FIGURES 46 to 54 show various types of joints by which membrane elements of the present invention can be secured to the inner walls of any of the tanks or containers described above. A common characteristic of all of these joints is that the edge portion of the membrane is wrapped around a marginal tube which is confined in a groove and is inflated with fluid under pressure, both to secure the edge portion of the membrane and to seal such edge portion in fluid-tight relationship to the container wall. Also, each of the constructions shown in FIGURES 46 to 49 and 51 to 54 includes a removable slot-obstructing member. When such member is removed access to the groove enables the tube to be inserted before or after being inflated. The slot-obstructing member can then be placed to restrict communication with the groove to a narrow slit through which the edge portion of the membrane extends, but which prevents escape of the marginal tube or cord 63.

In FIGURE 46 the container wall 52 has welded to it a joint strip 53 of special profile which is shown separately in the exploded view of FIGURE 47. The profile of this strip provides the groove 54 of special cross-sectional contour shown as being undercut at opposite sides to leave a slot 55 considerably narrower than the maximum width of the groove. Such strip 53 is curved longitudinally if it is to be applied to a curved tank wall. Preferably the groove 54 is located approximately midway between opposite edges of the strip and such opposite strip edges are secured by welding to the container wall 52 if both the strip and such wall are metal.

As has been mentioned above, for some purposes it may be desirable for the container walls to be flexible, such as being of fabric reinforced rubber material. In that event the edge portion of the membrane 3 can be reinforced, such as being folded and the fold bonded, and such reinforced membrane edge can then be vulcanized or otherwise suitably bonded directly to the flexible container wall made of rubber or plastic material. The specific marginal structures for the membrane 3 shown in FIGURES 46 to 54 are all of the rigid type intended to be used with rigid-walled containers.

In the membrane-to-container wall joints shown in FIGURES 46 to 49 the membrane edge retaining grooves all open in a direction parallel to the container wall. The groove entrance slot 55 in each instance is of a width great enough to receive tubing 56 into the slot by movement of such tubing transversely of its length. The contour of the side of the groove remote from the wall 52 preferably is generally complemental to the shape of the tubing. For purposes of inflation the tubing 56 in FIGURES 46 and 47 is shown as having a valve stem 57 which can be projected through an aperture 58 in the wall of the strip remote from the container wall 52. If desired, such aperture may be in the form of a deep notch in the strip flange forming one wall of the groove so that the valve stem can enter the aperture 58 by movement of the stem transversely of its length instead of by longitudinal movement.

From the relationship of the joint strip 53 and the marginal tubing 56 shown in FIGURE 47, the edge portion of the membrane 3 is wrapped around the tubing and then the tubing is moved transversely of its length through the slot 5 into the groove 54 to the relationship shown in FIGURE 46. If the tubing is then moved away from the wall 52 to seat in the groove a space will be left in such groove between the tubing and the wall of the groove adjacent to the container wall 52. Moreover, the side of the groove adjacent to the container wall is undercut, as shown in FIGURE 47, behind an adjacent portion of the strip wall. Into the space between such undercut portion of the groove and the tubing 56 an edge of a retainer 59 can be inserted through the groove entrance slot 55 from the position of FIGURE 47 to that of FIGURE 46.

It will be noted that in the structure of the strip 53, shown in FIGURES 46 and 47, the undercut portion of the groove 54 adjacent to the container wall 52 is of concave shape. The edge of the retainer 59 insertable into the groove 54 is of complemental convex shape on one side and the opposite side is concave, preferably of a curvature generally corresponding to the curvature of the adjacent side of the tubing 56. When the edge of retainer 59 has thus been inserted into the strip groove 54, therefore, the tubing 56 will be embraced rather closely between the wall of the groove 54 remote from the container wall 52 and the inserted edge portion of the retainer 59. Moreover, such retainer will have restricted the passage through the groove entrance slot 55 sufficiently to prevent escape of the tubing 56 from the groove, although the remainder of the slot is sufficiently wide to enable the two thicknesses of the membrane 3 to pass easily through it when the retainer edge portion is in the groove.

Also, it is preferred that the edge portion of the retainer 59 be inserted into the groove 54 by a combined edgewise advancing and swinging movement so that when the retainer has been moved into the position shown in FIGURE 46 the retainer cannot drop out of the groove, even if the groove entrance slot 55 opens downwardly, as shown in FIGURES 46 and 47. In fact, the retainer could not even be pulled directly downward because of the fit of its convex protuberance in the undercut portion of the groove. To facilitate removal of the retainer, therefore, an aperture 60 is provided in the retainer strip at a location spaced from its edge inserted in the groove 54 to enable a pointed tool to be engaged in the aperture 60 for swinging the retainer strip relative to the container wall 52 so that the retainer strip edge portion can be withdrawn from the groove 54.

In FIGURES 48 and 49 the joint strips 53' and 53", respectively, are generally similar to the joint strip 53, shown in FIGURES 46 and 47, except that the strip 53 would be cast in increments of convenient length and the strip 53' is fabricated from metal strips. Also, while the strip 53" of FIGURE 49 is of cast construction its cross-sectional shape is somewhat different from that of the strip 53. In each of the joint structures shown in FIGURES 48 and 49 the undercut portion of the groove 54 is formed by a projecting ledge. In FIGURE 48 the ledge is formed by a flat strip 61 welded to the container wall 52, and in the construction of FIGURE 49 the ledge is formed by a projection 61' cast integral with the strip 53".

While the retainers 59 of FIGURES 46 and 47, 59' of FIGURE 48 and 59" of FIGURE 49 are different cross-sectional shapes best suited in each case to the particular joint strip structure, all of such retainers function in the same manner and can be of the same length of sections. In each instance the sections should be quite short where there is curvature of the wall 52. The retainers 59' of FIGURE 48 and 59" of FIGURE 49 have shoulders engageable with the ledges formed by strip 61 of FIGURE 48 and projection 61' of FIGURE 49 to support the retainers positively. In addition, the retainer 59' of FIGURE 48 can be secured in place by a bolt 62 extending through a hole 60 in the retainer and threaded into the ledge-forming strip 61. The retainer 59' of FIGURE 49 also has in it a hole 60 in which a tool can be engaged to swing the retainer for disengaging its shoulder from the ledge of the strip formed by the projection 61'.

The shapes of the grooves formed cooperatively by the joint strips and the retainers in FIGURES 46, 48 and 49 in which the marginal tubing 56 is confined differ somewhat in shape. In FIGURE 46 the resultant groove is of substantially circular cross-section. The groove formed by the structure shown in FIGURE 49 also is of substantially circular cross-section, except that the walls of the strip cavity 53″ and retainer 59″ are scalloped lengthwise to provide an irregular surface engageable by the tubing-backed membrane 3 to afford a more positive grip on the edge portion of the membrane. In the fabricated joint structure of FIGURE 48 the groove formed cooperatively between the fabricated strip 53′ and the retainer 59′ is of irregular angular shape. The tubing 56′ is sufficiently flexible, however, so that when it is wedged into the groove by insertion of the retainer 59′ it will be deformed in cross-section to correspond generally to the shape of the groove.

When the tubing 56 is inflated by air under pressure supplied through the connection 57 the tubing will stretch somewhat and become much more rigid, so as to avoid any possibility of the tubing being pulled from the joint by pulling membrane 3. Moreover, inflation of the tubing in each instance will cause it to expand into the groove and clamp the edge portion of the membrane 3 tightly between the tubing and the joint strip. In order to eliminate all possibility of the tubing being pulled from the groove in the event that it should become punctured or deflated for any other reason, a rope 63, shown in FIGURES 48 and 49, can be inserted through the hollow interior of the tubing 56 so as to limit the extent to which the tubing can be contracted in cross-section without interfering with the inflatability of the tube. Such rope preferably is much smaller than the tube hollow.

A simplified type of membrane joint and anchoring strip structure is shown in FIGURE 50. In this instance the strip 64 is of unitary character, being of generally isosceles triangle shape in cross-section and having its base angles secured by welding to the container wall 52. A slot 55′ is provided along the apex of the strip which opens into the groove 54′ formed centrally in the strip. The maximum width of such groove is considerably greater than the minimum width of the access slot 55′. Also, the width of the slot 55′ will, of course, be less than the diameter of the cylindrical tubing 56 so that it will be necessary to squeeze the tubing in order to insert it through the slot into the groove 54′, in the manner shown in FIGURE 49. Because of the undercut character of the opposite groove walls the inherent resilience of the tubing will tend to prevent it from being pulled through the slot 55′ by pulling on the membrane 3. When the tubing is inflated, however, the resistance to its withdrawal from the groove 54′ by such a pull will be increased greatly.

In FIGURES 51 to 54, inclusive, a somewhat different type of fabricated membrane anchoring and sealing type of joint is illustrated. In each instance the tubing-receiving groove is of generally rectangular cross-sectional shape and the access slot to such groove is at least as wide as the maximum width of the groove. Such access slot is, however, in each instance blocked by a removable groove-obstructing member which almost completely closes the entrance to the groove receiving the tubing 56 and the edge portion of the membrane 3 wrapped around it. The types of structure shown in FIGURES 51 to 53 are particularly well suited to the economical formation of a cavity for receiving and retaining marginal tubing of different sizes which it may be desirable to use.

In FIGURE 51 the joint includes a spacer bar 64′ welded to the container wall 52 and a strip 65 welded to the bar 64 and having a portion overhanging the bar to form the groove 54″ receiving the tubing 56. The access opening to the groove is closed by a bar 66 of generally rectangular cross section, which is secured to the strip 65 by cap screws 67. The bar 66 is somewhat narrower than the thickness of bar 64 so as to provide a narrow opening between the container wall 52 and the edge of bar 66 adjacent to it for passage of the edge portion of membrane 3. The tubing 56 is thus confined between the bars 64′ and 66. To insure that pulling force on the membrane 3 cannot move the tubing 56 between bar 66 and the container wall 52 a rope 63 of the type previously described in connection with FIGURE 49 can be threaded through the tubing to limit the extent to which such tubing can be squeezed in the event that it should be deflated for any reason.

The structure shown in FIGURE 52 is similar to that of FIGURE 51, except that in this instance the construction is particularly suited to the formation of a groove for reception of larger tubing 56. In this instance the strip 65 is spaced from the container wall 52 by the channel member 64′ instead of by a solid bar such as the bar 64 of FIGURE 51. The edge flanges of channel 64′ are welded to the container wall 52 and the strip 65 in turn is welded to the web of the channel in a position such that its edge portion projects beyond one flange of the channel to form thhe tubing-receiving groove 54″. This groove is closed by an angle member 66′ except for a narrow slot between one flange of the angle and the container wall 52 for passage of the edge portion of membrane 3. The flange of such angle member parallel to but remote from container wall 52, which is in face-to-face engagement with the overhanging portion of strip 65, is secured to such strip portion by cap screws 67′. In this instance, also, the tubing 56 may have a rope 63 threaded through it.

The tubing-receiving groove 54″ in FIGURE 53 is formed by a strip 64″ disposed with its width extending perpendicular to the container side 52. The edge of this strip abutting the container wall is welded to it and its opposite edge is engaged with and welded to the underside of a strip 65′ bent to provide one edge portion bridging between the container wall and the edge of strip 64′ remote from such container wall, and its other edge portion overhanging the side of strip 64″ remote from the edge portion of strip 65′ extending to the container wall 52. In this instance the angle 66′ mounted to obstruct the opening to the groove preferably has a flange portion disposed perpendicular to the container wall 52, which is spaced somewhat farther from such wall than the flange of the angle in FIGURE 52.

To insure that the tubing 56 cannot escape from the groove between the container wall 52 and the angle 66′ a yieldable rubber strip 68 of triangular cross section is inserted into the groove between the container wall 52 and the tubing 56 with a wider portion adjacent to the groove bottom and a narrower portion adjacent to angle 66′. Preferably a portion of the strip 68 actually extends between the angle flange and the container wall, and the thickness of such portion and the width of the angle flange are such that the edge portion of such flange presses the edge portion of the membrane 3 firmly against the strip 68 to deform it to some extent and secure such strip positively in the groove. The combination of the strip 68, the tubing 56 and the rope 63 threaded through the tubing thus guarantees that the edge portion of membrane 3 cannot escape from the groove 54″ and effects a continuous fluidtight seal.

The construction shown in FIGURE 54 would be particularly applicable for the membrane installation of FIGURES 28 and 29, and would also be useful for the structure of FIGURES 34 and 35. The basic structure of this joint is similar to that shown in FIGURE 52 in that such joint includes a channel 64′, the flanges of which are welded to the container wall 52. An edge portion of strip 65 is welded to the web portion of channel 64′ and the other edge portion of the strip projects beyond a flange of channel 64′ to form the groove 54″. The tubing 56 with the edge portion of membrane 3 wrapped around it is held in the groove 54″ by the angle 66′, which is secured in place by a row of bolts 67′ projecting through a band 65′ overlying the strip 65. Such bolts extend through such strip and are threaded into the angle 66'. The edge of the membrane sheet forming the inner side of pockets 21 is clamped between the band 65' and strip 65 to hold it in position. Also, such membrane may have a rolled edge 21' at the side of the band opposite the pockets 21 further to deter escape of the membrane edge.

While, as has been pointed out above, the width of the groove in a structure such as shown in FIGURE 54 is wide enough to receive the tubing 56, even if it is inflated, it will be evident that placement of the retaining angle 66' effects deformation of such tubing from a form of substantially circular cross section to a substantially square cross-sectional shape. If the tube were inflated prior to the operation of securing it in the groove it might be very difficult to deform the tube to the generally square shape necessary to enable the bolts 67" to be inserted. Consequently, the tubing will usually be inflated after the angle 66' has been secured in place.

In the joints shown in FIGURES 51, 52 and 53, a valve stem connected to the tubing can simply extend through the retainer and such valve stems are designated 69 in those figures. In the construction of FIGURE 54, however, the side of the retainer exposed in FIGURES 51, 52 and 53 is covered by the structure of pockets 21. In this instance, therefore, the valve stem 69' extends from the tubing 56 through a tube 69" passing through the opposite flanges of channel 69'. A nut 70 screwed onto the end of the valve stem will hold it in place. In each instance of FIGURES 51 to 54, therefore, the tubing 56 can be inflated after it has been secured in place in a manner shown in these figures by the joint structure.

Alternatively, if the tube 56 is expanded by supplying fluid pressure to its interior prior to its insertion into the joint retaining groove the provision of a valve stem would not necessarily be required. Fluid could be injected into the tube through a hypodermic type of hollow needle which could simply pierce the wall of the tube. After inflation of the tube the needle could be withdrawn and the material of the tube wall would expand to seal the puncture made by the needle automatically. Such inflation of the tube 56, whether performed prior or subsequent to insertion of the tube into the tube-retaining groove of the joint, could be either gas under pressure or liquid. If liquid is injected into the tube after it has been installed and confined in the tube-retaining groove of the joint, such liquid could be in the form of a suitable resin which would set in place within the tube to form a solid structure. If desired, such resin could be of the foaming type to exert internal pressure within the tube as it sets.

In FIGURES 55, 56 and 57, a somewhat different type of membrane arrangement is shown installed in a marine cargo-carrying vehicle or vessel. In this instance the vessel is illustrated as including a substantially cylindrical shell 70 which preferably is of rigid construction, although it could be inflatable. The opposite ends 71 of this shell are shown as being of generally conical shape to facilitate movement of the vessel through the water. One side of the vessel has in it ports 47 through which discrete particle material can be loaded into the hull. It is preferred that the hull be divided into two compartments by a partition 72, shown best in FIGURE 57 as being formed by two coupped heads arranged with their concave sides facing each other and their convex sides facing the opposite ends of the hull so as to be able to withstand a substantial amount of pressure difference between the two compartments.

In each of the compartments formed at opposite sides of the partition 72 are membrane liners 73, each having an open base secured around the hull by a joint 74 at a location adjacent to the fixed partition 72. Each of these membranes forms a floating partition wall within its chamber which can be shifted from the expanded condition shown at the left of FIGURE 57 to a collapsed condition, such as shown at the right of FIGURE 57.

The membrane material should be quite limp and should be shaped so that when it is in the expanded condition, as shown at the left of FIGURE 57, it will conform closely to the contour of the hull and will be able to lie against and be supported by the wall of the hull as a liner so that it will not be necessary for the liner to withstand any appreciable tension load itself.

In order to unload discrete particle material from the two compartments at opposite ends of the hull pipes 75 are arranged to be connected to the tips of the opposite hull ends. The connections 76 for such pipes should be of the rotary sealing gland type. Also, while the unloading mechanism is illustrated as conveying pipes 75, the mechanism could be of some other type, such as a bucket conveyor arrangement or a screw conveyor arrangement, as long as such unloading mechanism is contained in a watertight enclosure, because it is contemplated that the discharge openings at opposite ends of the hull will be under water during the unloading operation. When the unloading mechanism is disengaged from the hull the discharge ports 77 can be sealed by a suitable valve 78 which may be of the butterfly type. An air supply pipe 79 is shown at the right of FIGURE 5 as extending through the discharge pipe 75 by which air under pressure can be supplied to the interior of the vessel for pressurizing its hull to force material up through the discharge pipe 75 to a suitable receiver.

A sufficient number of loading ports 47 is provided along one side of the hull 70, which normally would be above the level of the water in which the vessel floats during loading, so that the material would be distributed substantially uniformly throughout the length of the hull during transit. It is expected that the hull would float somewhat submerged or nearly submerged when thus loaded, and consequently it would not be practical to lift the hull sufficiently to expose both discharge ports 77 in opposite ends of the hull above the water level during unloading.

It would be possible to unload some types of material simply by forcing the material toward the discharge port 77 by internal pressure. For such purpose it would be possible to incline the hull sufficiently to expose one of the discharge ports 77 above the surface of the water and unload first the compartment with which that port is in communication. To effect such an unloading operation fluid under pressure could be supplied through a connection 80 to the space within the collapsed membrane 73, as shown at the right of FIGURE 57. Such membrane expanded by such fluid under pressure would force the material to the right in the right compartment and discharge it from the port 77 into an outlet pipe 75. Such fluid under pressure could be pressurized gas or liquid under pressure, or some combination of such fluids. It may be desirable to supply gas in this fashion in quantities sufficient to provide the desired longitudinal trim of the vessel during unloading. Sufficient liquid should be supplied to offset the principal portion of the weight of the material discharged from this compartment. When it has been emptied completely the discharge pipe can be disconnected, the valve 78 can be closed to seal the discharge port 77 and gas can be vented from the space within the membrane 73 and replaced by liquid to the extent necessary to alter the trim of the vessel so that the discharge port at the opposite end will be elevated above the surface of the water. Fluid under pressure can then be supplied through a connection 80 to the compartment in the opposite end of the vessel to discharge its contents in the same manner.

Cargo carrying vessels of the type shown in FIGURES 55, 56 and 57 can be very large, such as several hundred feet long and perhaps 20 to 40 feet in diameter. It may be difficult to discharge discrete particle material, particularly of coarser type, from a vessel of this nature. It is also desirable to be able to unload such material extremely rapidly. To facilitate unloading of such material a helical rib 81 is provided in each of the compartments of the vessel at opposite sides of the partition 72 which are convoluted in opposite senses. Consequently, rotation of the vessel about the axis of its hull will cause the helixes to work the material in opposite directions away from the partition toward and to the discharge ports 77 as the vessel rotates. Ribs 81 may be inflatable tubes or rigid.

In order to utilize the helixes 81 effectively to assist in unloading the vessel it is desirable for the hull to be substantially horizontal. Also, material should be discharged from both ends of the hull simultaneously. During such operation, therefore, it would be necessary for both discharge pipes 75 to be connected to the respective ends of the hull by the rotatable couplings 76 while the conduits 75, or such other cargo removing mechanism as might be used, should be somewhat flexible to accommodate sporadic movement of the hull. It is necessary to steady the hull approximately in the partially submerged position shown in FIGURE 55. For this purpose a steadying yoke 82 mounted on a lengthwise adjustable bar support 83 is provided at opposite ends of the hull engageable with the generally conical portions to hold the hull in position both lengthwise and transversely of its length.

The steadying devices 82 have rollers engaging the hull surface, as shown in FIGURES 55 and 56, which guide the vessel for rotation about the axis of the hull, but hold it against bodily rolling in one direction or the other, which would displace the ends of conduits 75 connected to the vessel. The hull can be rotated about its axis to effect lengthwise movement of material within it by the ribs 81 in various ways. Two types of hull-rotating means are shown in FIGURE 55, which can be used jointly or separately.

One type of hull-rotating means includes ring gears 84 located at opposite ends of the hull which are turned by pinions 85 driven by motors 86. Such pinions and motors are carried by the ends of supporting bars 87 guided for vertical reciprocation so that they can be adjusted to hold the pinions down in mesh with the ring gears on the floating hull 70. Another type of hull-rotating mechanism includes a line 88 having one portion wrapped around the hull a plurality of times and another portion wrapped a plurality of times around a capstan driven by motor 90. Such capstan and motor are mounted on a lengthwise reciprocable bar 91 which can be moved lengthwise to maintain proper tension on the line 88. The pull on such line will also tend to maintain the ring gears in engagement with pinions 85. Such drum rotating means can be operated either separately or conjointly to rotate the hull at an appropriate speed.

In operating the vessel, suction can be applied to the two connections 80 while one of the loading ports 47 for each compartment is opened to atmospheric pressure. Such atmospheric pressure will move each liner membrane from the position at the left of FIGURE 57 to a position generally like that at the right of FIGURE 57, while expelling gas and liquid from within the membrane through the connections 80 to the extent necessary to effect such collapse of the membrane. The hull can then be filled with discrete particle material, sludges or slurries through the loading ports 47. The lading in the two ends of the hull may be of different character if desired.

While, as has been mentioned, the membranes 73 can be retracted to the position shown at the right of FIGURE 57 prior to material being loaded into the hull, the material being loaded can be supplied under pressure so that the lading itself can push the membranes back. Ordinarily such an expedient is practical, however, only if the material is of fluid character unless a sufficiently high atmospheric pressure is provided ahead of granular or particle material to collapse the membranes. Also even discrete particle material can be loaded into the hull through the end openings 77 if the hull is rotated during such loading operation in the direction opposite the direction in which the hull is rotated during unloading. The helical rib 81 would then work the material toward the partition 72 until the interior of the hull is filled.

When the hull has been filled the specific gravity of the assembly should be approximately unity so that the vessel can be towed in a slightly submerged condition, if desired. Whatever the cargo of the vessel it will be evident that sufficient air space can be left above the lading, depending on the nature of the cargo, to provide the desired specific gravity of the assembly. It is important that the hull be loaded to approximately such specific gravity both for the purpose of enabling it to float sufficiently low in the water to minimize the stress produced on it by waves and, secondly, to provide support for the shell to withstand to better advantage stresses which waves and tides may exert on the hull. To stiffen the hull further and support it against crushing by the external hydraulic pressure, air or gas under pressure can be supplied to the hull so as actually to pressurize its interior above atmospheric.

When the vessel has reached its destination the material will be discharged from it in the manner described above and the membranes 73 expanded into the condition shown at the left of FIGURE 57 to assist in expelling the material. The space within the membranes can be filled with water through the connections 80 to the extent necessary again to establish the weight of the entire assembly at a specific gravity of approximately one, so that the vessel can float or be towed in virtually the same attitude during the return trip. For this purpose the liquid within the membrane liners can be a useful cargo, such as oil or sludge or slurry, if desired.

While loading or unloading discrete particle material from any of the containers described above, it may be desirable to limit as far as possible air in the space occupied by discrete particle material, particularly if such material is in powdered form and is combustible. Reduction of the amount of air in the space occupied by such material will greatly reduce the explosion hazard. Consequently, during the container-filling operation supply of the material can press the membrane means back toward the wall until the cargo space is filled and the membrane is in its lining position. When the material is discharged from the container sufficient pressure will be exerted by fluid, either gas or liquid, on the side of the membrane opposite the discrete particle material to maintain such membrane in contact with the body of the material remaining in the container at all times. By such procedure the quantity of oxygen which could support combustion or explosion by combination with the material is minimized.

When discrete particle material of edible character is stored or transported in a container of any of the types described above, the inclusion of a membrane enables the material to be protected against infestation by worms or insects or contamination by bacteria. Growth of insects in the space between a membrane member and a wall of the container can be prevented by filling this space with inert or insecticidal gas, and such gas can also be used to displace air in the material-containing compartment. Such gas could, for example, be nitrogen and carbon dioxide. Because such gas has not been in contact with the discrete particle material, it can be conserved when withdrawn from the container, compressed, stored and reused as needed. Use of inert gas would also provide a blanket over or around the membrane-covered material of an atmosphere which would not support combustion in case the membrane should be ruptured and would tend to extinguish any fire which might be started on the material side of the membrane. The explosion hazard would thus be greatly reduced. Such hazard can also be reduced where the material is of discrete particle type by keeping it covered closely with a membrane to reduce as far as possible the air content of the space containing the material.

For control of infestation by worms or other insects and bacterial growth, an inert atmosphere could be held in the material-containing compartment at a pressure of one ounce to fifty pounds, depending upon the pressure-resistant character of the container, for a period of at least eighteen hours. The amount of such inert gas, or insecticidal and bactericidal gas, required for this purpose can be minimized if a somewhat greater fluid pressure is applied to the opposite side of the membrane so as to maintain the membrane in close contact with the body of discrete particle material. At the end of this period the inert, insecticidal or bactericidal atmosphere can be removed from the material-containing chamber and replaced by air, but it will still be desirable to maintain the membrane in close contact with the body of material. The advantage of inert gases is that they are non-toxic to humans and in case of certain products, such as flour, can maintain the flour in its non-aged condition. Aging here refers to changes in the baking qualities which occur as a result of oxygen effect on the carotene content and liberation of $CO_2$ as a result.

Both during storage of discrete particle material in a container, whether or not in transit, and while such material is being loaded and discharged from the container, it is important for the material to be as compact as possible. The container can hold the greatest possible amount of material under such circumstances and consequently it is desirable to compact such material periodically during loading. Such compaction can be effected by covering the material with a flexible membrane and providing a differential pressure on its opposite sides to press it into engagement with the material, the higher pressure being against the side opposite such material while allowing the entrained air to be bled or sucked out.

The explosion hazard of combustible powdered material can be reduced greatly if a minimum of air is mixed with the material, particularly during unloading. Differential pressure can be maintained on a membrane covering the discrete particle material as it is discharged to hold it close to the load, as described above. If the material is withdrawn from the container by suction, simply atmospheric air can be provided at the other side of the membrane; or if the membrane is in a container which can be pressurized, fluid under pressure greater than atmospheric can be supplied to the space between the membrane and the container, which pressure would also be in excess of the pressure at the side of the membrane engaged with the material even though this latter pressure is greater than atmospheric pressure. The membrane would, therefore, follow the material and be maintained in engagement with it as material is discharged from the container. If it is desired to eliminate the explosion hazard completely, inert gas can replace air while loading and unloading.

I claim as my invention:

1. The method of deterring deterioration of discrete particle material in a container, which comprises providing a container having a rigid wall and a flexible membrane partition therein having its margin sealed to the container wall at one side of discrete particle material received in the container, replacing air with inert gas in the container at the discrete particle material side of the membrane, and supplying to the container between the rigid container wall and the side of the membrane opposite the discrete particle material gas at a pressure higher than atmospheric pressure and higher than the pressure on the discrete particle material side of the membrane and thereby simultaneously moving the membrane toward the discrete particle material and increasing the pressure of the inert gas to a pressure greater than atmospheric pressure.

2. The method of deterring deterioration of discrete particle material defined in claim 1, including maintaining the inert gas under such pressure greater than atmospheric pressure for a period of at least approximately sixteen hours for exterminating infestation.

3. The method of deterring deterioration of discrete particle material defined in claim 1, including initially connecting a suction source to the container at the discrete particle material side of the membrane and supplying higher fluid pressure to the opposite side of the membrane for pressing the membrane against the discrete particle material and expelling air from the discrete particle material by the pressure of the membrane acting thereon, and replacing air with the inert gas in the container at the discrete particle material side of the membrane and then supplying between the container wall and the side of the membrane opposite the discrete particle material the gas at a pressure higher than the pressure on the discrete particle material side of the membrane.

4. The method of protecting material in a container which comprises providing a flexible membrane in the container having its marginal portion in sealing engagement with the container for forming a partition therein establishing two compartments in the container, supplying to one of such compartments material to be stored in the container, and removing air from such one compartment while simultaneously supplying inert gas to the other compartment.

5. The method of deterring contamination by organisms in a container, which comprises providing a flexible membrane in the container having its marginal portion in sealing engagement with the container for forming a partition therein establishing two compartments in the container, supplying contaminatable material to a first one of such compartments, supplying inert gas to such compartment containing contaminatable material, sealing such first compartment, supplying to the other of such compartments gas at a pressure higher than atmospheric pressure and thereby expanding such other compartment by movement of the membrane and continuing to supply gas thereto until the pressure of the inert gas in the first compartment has been increased to a pressure substantially greater than atmospheric pressure, and continuing such pressure in such other compartment for a considerable period of time and thereby maintaining the inert gas is such first compartment at a pressure greater than atmospheric pressure for such period.

6. The method of deterring contamination by organisms in a container defined in claim 5, which includes sucking air from the first compartment before supplying inert gas to it.

7. The method of deterring contamination by organisms in a container defined in claim 5, in which the gas supply to the other compartment at a pressure higher than atmospheric pressure is inert gas.

8. The method of deterring contamination by organisms in a container defined in claim 5, including the steps of opening the first compartment at the end of such considerable period, removing inert gas therefrom and replacing such inert gas with air.

9. The method of densifying discrete particle material by packing it downward in a rigid container, which comprises providing a flexible membrane within the container and sealed relative to the interior of the container, supplying discrete particle material through an opening in the upper portion of the container into the lower portion of the container and beneath the membrane unconfined except by such rigid container and flexible membrane, subjecting the membrane to a fluid pressure differential by supplying gas between the rigid container and the side of the membrane opposite such discrete particle material while simultaneously sucking air from the portion of the container at the side of the membrane engageable with the discrete particle material through an opening in the container unobstructed by the membrane and arranged to prevent passage of such discrete particle material therethrough, and thereby pressing the membrane downward principally on the upper extent of the unconfined discrete particle material to pack it, thereafter subjecting the membrane to reverse differential pressure and thereby raising the membrane from engagement with the upper extent of the discrete particle material, and placing additional material in the upper portion of the container beneath the membrane and onto the discrete particle material thus packed in the container.

References Cited

UNITED STATES PATENTS

| | | | |
|---|---|---|---|
| 1,372,190 | 3/1921 | Randall et al. | 100—35 X |
| 1,703,782 | 2/1929 | Schmidt | 99—8 |
| 2,923,826 | 12/1952 | Grinstead | 99—174 |
| 2,764,950 | 10/1956 | Finnell. | |
| 3,022,923 | 2/1962 | Hoffman. | |
| 3,172,556 | 3/1965 | Hiefel | 220—85 |
| 3,214,221 | 10/1965 | Finnegan | 99—189 X |
| 1,405,440 | 2/1922 | Randall et al. | 100—211 |
| 2,824,438 | 2/1958 | Candor | 100—211 |
| 3,020,121 | 2/1962 | Bull | 141—66 |

THERON E. CONDON, *Primary Examiner.*

J. R. GARRETT, *Assistant Examiner.*